(12) United States Patent
Masuda et al.

(10) Patent No.: US 11,073,671 B2
(45) Date of Patent: Jul. 27, 2021

(54) TERMINATION UNIT

(71) Applicants: SEI Optifrontier Co., Ltd., Yokohama (JP); Japan Communication Accessories Manufacturing Co., Ltd., Komaki (JP); SUMITOMO ELECTRIC INDUSTRIES, LTD., Osaka (JP)

(72) Inventors: Kazuya Masuda, Yokohama (JP); Junji Fukui, Yokohama (JP); Tomoyuki Yokokawa, Yokohama (JP); Tetsuya Oosugi, Komaki (JP); Takayuki Yokochi, Komaki (JP); Masanori Yamanaka, Komaki (JP); Tsuneari Ito, Yokohama (JP)

(73) Assignees: SEI OPTIFRONTIER CO., LTD., Yokohama (JP); JAPAN COMMUNICATION ACCESSORIES MANUFACTURING CO., LTD., Komaki (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 153 days.

(21) Appl. No.: 16/464,802

(22) PCT Filed: Nov. 27, 2017

(86) PCT No.: PCT/JP2017/042449
§ 371 (c)(1),
(2) Date: May 29, 2019

(87) PCT Pub. No.: WO2018/101215
PCT Pub. Date: Jun. 7, 2018

(65) Prior Publication Data
US 2021/0055497 A1 Feb. 25, 2021

(30) Foreign Application Priority Data

Nov. 30, 2016 (JP) .............................. JP2016-232721

(51) Int. Cl.
*G02B 6/44* (2006.01)
*G02B 6/46* (2006.01)

(52) U.S. Cl.
CPC ......... *G02B 6/4452* (2013.01); *G02B 6/4455* (2013.01); *G02B 6/4471* (2013.01); *G02B 6/46* (2013.01)

(58) Field of Classification Search
None
See application file for complete search history.

(56) References Cited

U.S. PATENT DOCUMENTS 5,071,211 A * 12/1991 Debortoli ............. G02B 6/4455
    385/76
5,490,229 A *  2/1996 Ghandeharizadeh ........................
    G02B 6/4452
    385/135

(Continued)

FOREIGN PATENT DOCUMENTS

JP     2000-231020 A    8/2000
JP     2000-231021 A    8/2000

(Continued)

OTHER PUBLICATIONS

Notice of Allowance dated Jul. 30, 2020 that issued in U.S. Appl. No. 16/464,791.

(Continued)

*Primary Examiner* — Michael Stahl
(74) *Attorney, Agent, or Firm* — Faegre Drinker Biddle & Reath LLP

(57) ABSTRACT

A termination unit includes: a plurality of first optical fibers fusion-connected to a multicore cable; a tray slidable in a (Continued)

first direction, the tray being provided on one end side of the termination unit in the first direction; and a plurality of adapters which are provided in a line on the tray, to which a plurality of second optical fibers are connected from each of one end sides of the adapters, and to which the plurality of first optical fibers are connected from each of the other end sides of the adapters, in which the tray has a cover part for protecting the plurality of adapters, and in which the cover part is rotatable with a shaft that extends along a second direction, and the cover part rotates downward when the tray has slid in a direction toward the one end side from the other end side.

11 Claims, 17 Drawing Sheets

(56) References Cited

U.S. PATENT DOCUMENTS

| | | | |
|---|---|---|---|
| 6,289,159 | B1 | 9/2001 | Van Hees et al. |
| 6,556,763 | B1 | 4/2003 | Puetz et al. |
| 6,584,267 | B1 | 6/2003 | Caveney et al. |
| 6,614,978 | B1 | 9/2003 | Caveney |
| 6,633,718 | B1 | 10/2003 | Thom |
| 6,796,437 | B2 | 9/2004 | Krampotich et al. |
| 6,853,795 | B2 | 2/2005 | Dagley et al. |
| 8,216,004 | B2 | 7/2012 | Follingstad et al. |
| 9,341,798 | B2 | 5/2016 | Smith et al. |
| 9,389,384 | B2 | 7/2016 | Solheid et al. |
| 10,175,443 | B1 | 1/2019 | Masuda et al. |
| 2005/0111809 | A1* | 5/2005 | Giraud ................ G02B 6/4455 385/135 |
| 2006/0228086 | A1 | 10/2006 | Holmberg et al. |
| 2007/0189693 | A1 | 8/2007 | Smrha et al. |
| 2013/0028567 | A1 | 1/2013 | Parikh et al. |
| 2017/0322384 | A1* | 11/2017 | Burkett ................ G02B 6/4447 |
| 2017/0343757 | A1 | 11/2017 | Giraud et al. |
| 2018/0074275 | A1 | 3/2018 | Thompson et al. |
| 2019/0064465 | A1* | 2/2019 | Yamauchi ............ G02B 6/4454 |
| 2019/0064468 | A1* | 2/2019 | Yamauchi ............ G02B 6/3825 |
| 2019/0250351 | A1 | 8/2019 | Yamauchi et al. |
| 2019/0278039 | A1 | 9/2019 | Geens et al. |
| 2019/0293889 | A1* | 9/2019 | Masuda ................ H05K 5/02 |
| 2019/0346645 | A1* | 11/2019 | Yamauchi ................ G02B 6/46 |

FOREIGN PATENT DOCUMENTS

| | | |
|---|---|---|
| JP | 2001-4849 A | 1/2001 |
| JP | 2003-215352 A | 7/2003 |
| JP | 2004-53989 A | 2/2004 |
| JP | 2008-52195 A | 3/2008 |
| JP | 2008-224892 A | 9/2008 |
| JP | 2012-53098 A | 3/2012 |
| JP | 2012-108176 A | 6/2012 |
| WO | WO-2018/101215 A1 | 6/2018 |
| WO | WO-2018/101218 A1 | 6/2018 |
| WO | WO-2018/101222 A1 | 6/2018 |

OTHER PUBLICATIONS

Office Action dated Apr. 3, 2020 that issued in U.S. Appl. No. 16/464,791.

Office Action dated Jun. 8, 2020 that issued in U.S. Appl. No. 16/464,811.

* cited by examiner

TERMINATION UNIT

TECHNICAL FIELD

The present invention relates to a termination unit.

BACKGROUND ART

For example, Patent Literature 1 below discloses an optical distribution board including a plurality of adapter groups arranged along an up-down direction, and a fiber storage part for housing an optical fiber cord connected to the adapter groups. In the fiber storage part, the optical fiber cord is held by a holding member, raised after hanging down along a lower guided curved part, and suspended by suspension means.

CITATION LIST

Patent Literature

[Patent Literature 1] Japanese Unexamined Patent Publication No. 2012-53098

SUMMARY OF INVENTION

A termination unit according to an aspect of the present invention is a termination unit located in a rack part of an optical fiber rack, including: a plurality of first optical fibers that are fusion-connected to a multicore cable introduced from an outside of the optical fiber rack; a tray slidable in a first direction, the tray being provided on one end side of the termination unit in the first direction; and a plurality of adapters which are arranged in a line on the tray, to which a plurality of second optical fibers are connected from each of one end sides of the adapters, and to which the plurality of first optical fibers are connected from each of the other end sides of the adapters, in which the tray has a cover part for protecting the one end side of the plurality of adapters, and in which the cover part is rotatable with a shaft that extends along a second direction intersecting the first direction as a supporting shaft, and the cover part rotates downward when the tray has slid in a direction toward the one end side from the other end side.

BRIEF DESCRIPTION OF DRAWINGS

FIG. 1 is viewed from a back side;

DESCRIPTION OF EMBODIMENTS

Technical Problem of Present Disclosure

Figure 1:
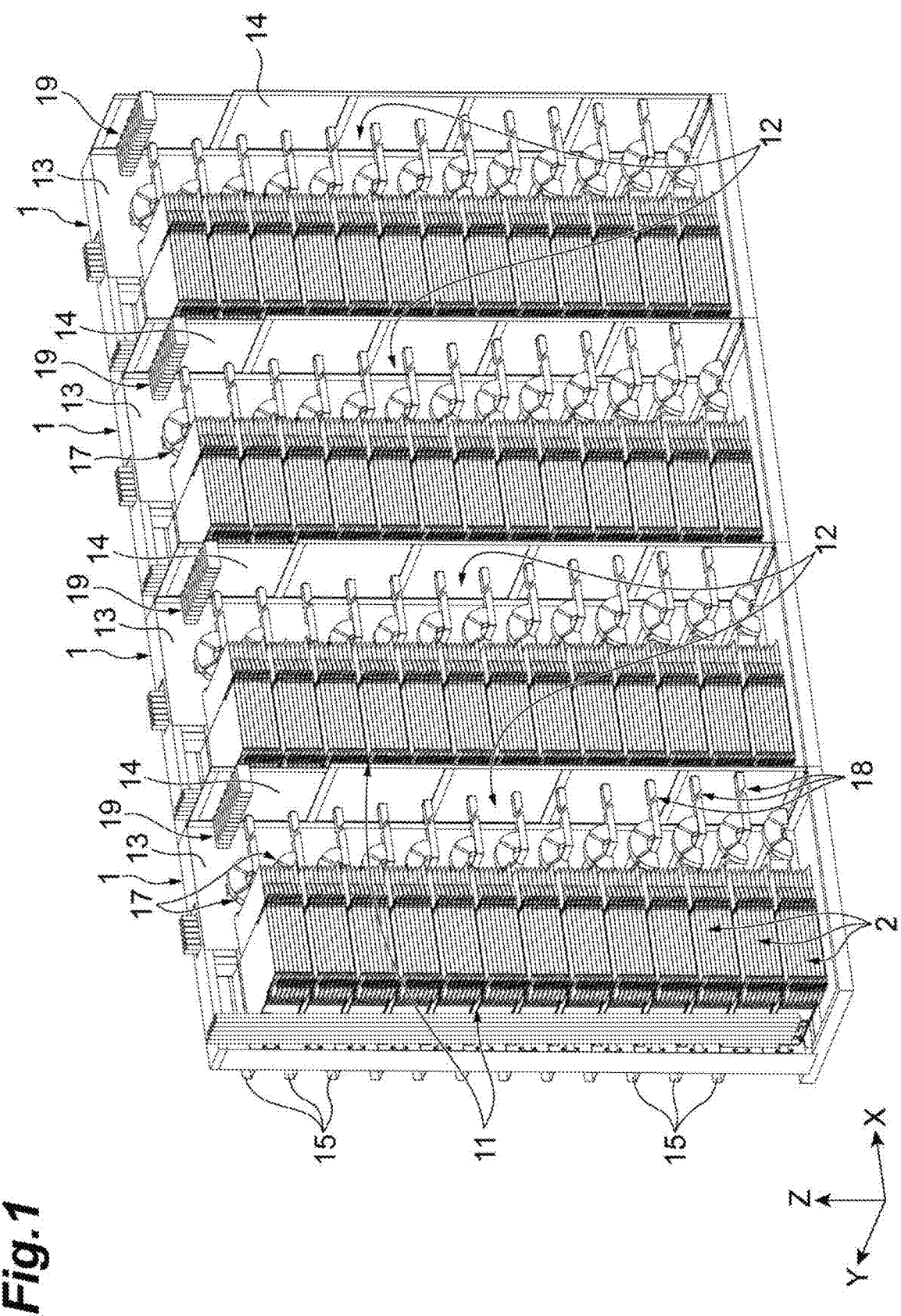
FIG. 1 is a view illustrating a state where optical fiber racks according to an embodiment are arranged along one direction.

An optical fiber rack used in a base station or the like of an optical communication system includes a plurality of arranged rack parts in which a plurality of termination units (adapter groups in Patent Literature 1) are provided in an up-down direction. A plurality of optical fibers are connected to a plurality of adapters included in each of the termination units. With the recent increase in the amount of optical communication, in such optical fiber racks, it is desirable that a large number of adapters be arranged at high density, for example, in the up-down direction and in a left-right direction in the termination unit. However, when the adapters are arranged at high density, there is a problem that it is difficult for the finger of an operator to enter and the operation is difficult when inserting or removing an optical connector in each of the adapters.

Here, in the termination unit provided in the optical fiber rack, an object of the present invention is to facilitate the insertion and removal of the optical connector in each of the adapters.

Effects of Present Disclosure

According to the present disclosure, in the termination unit provided in the optical fiber rack, it is possible to facilitate the insertion and removal of the optical connector in each of the adapters.

Description of Embodiment of Present Invention

Firstly, a description will be given of contents of embodiments of the present invention in a listing manner.

One embodiment of the present invention is a termination unit located in a rack part of an optical fiber rack, including: a plurality of first optical fibers that are fusion-connected to a multicore cable introduced from an outside of the optical fiber rack; a tray slidable in a first direction, the tray being provided on one end side of the termination unit in the first direction; and a plurality of adapters which are arranged in a line on the tray, to which a plurality of second optical fibers are connected from each of one end sides of the adapters, and to which the plurality of first optical fibers are connected from each of the other end sides of the adapters, in which the tray has a cover part for protecting the one end side of the plurality of adapters, and in which the cover part is rotatable with a shaft that extends along a second direction intersecting the first direction as a supporting shaft, and the cover part rotates downward when the tray has slid in a direction toward the one end side from the other end side.

The termination unit includes the tray slidable in the first direction (for example, a front-rear direction) and the plurality of adapters provided side by side in a line on the tray. In addition, the plurality of second optical fibers are connected to one end side of the plurality of adapters, and the plurality of first optical fibers fusion-connected to the multicore cable introduced from the outside are connected to the other end side. According to such a configuration, when inserting or removing the second optical fiber in the adapter, it becomes easy to pinch the upper and lower surfaces of the optical connector of the second optical fiber with fingers, and the insertion and removal of the optical connector can be easily performed. Therefore, the adapters can be arranged at high density.

In the termination unit, the cover part for protecting one end side of the plurality of adapters is rotatable with a shaft that extends along the second direction as a supporting shaft. In addition, when the tray has slid in a direction (for example, a front direction) from the other end side to the one end side, the cover part rotates downward. Accordingly, it becomes easy for the finger to contact the lower surface of the optical connector of the second optical fiber, and the optical connector can be more easily inserted and removed.

The tray may further include a support part which is arranged with the cover part in the second direction and locks and supports the cover part. Accordingly, the operator can perform the rotation operation of the cover part at any timing, and the workability can be improved.

Details of Embodiments According to the Present Invention

Hereinafter, a description is given in detail of preferred embodiments of the invention with reference to the attached drawings. In the following description, the same components or components having the same function are designated by the same reference sign, and a duplicated description is omitted.

Figure 2:
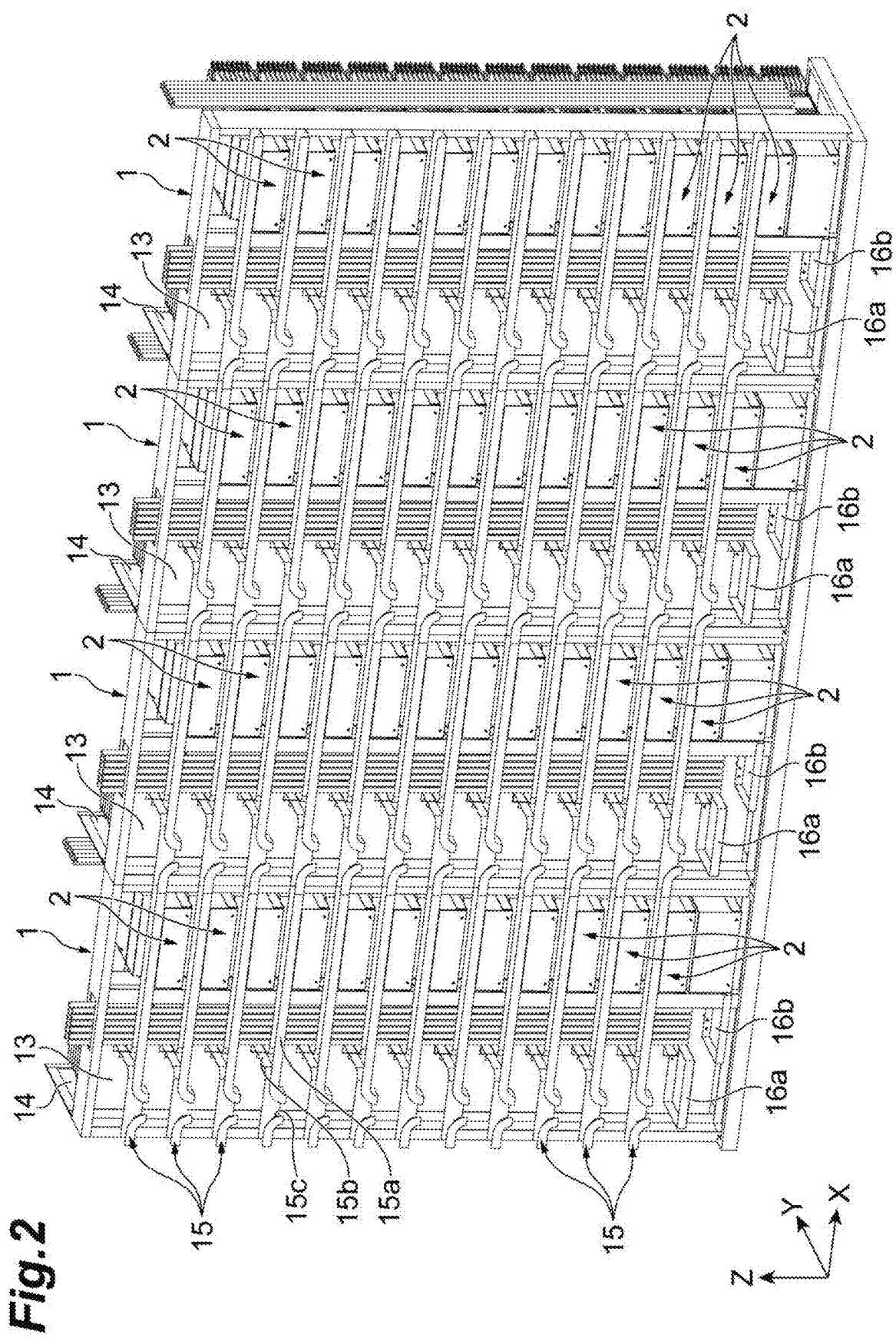
FIG. 2 is a view when
Figure 3:
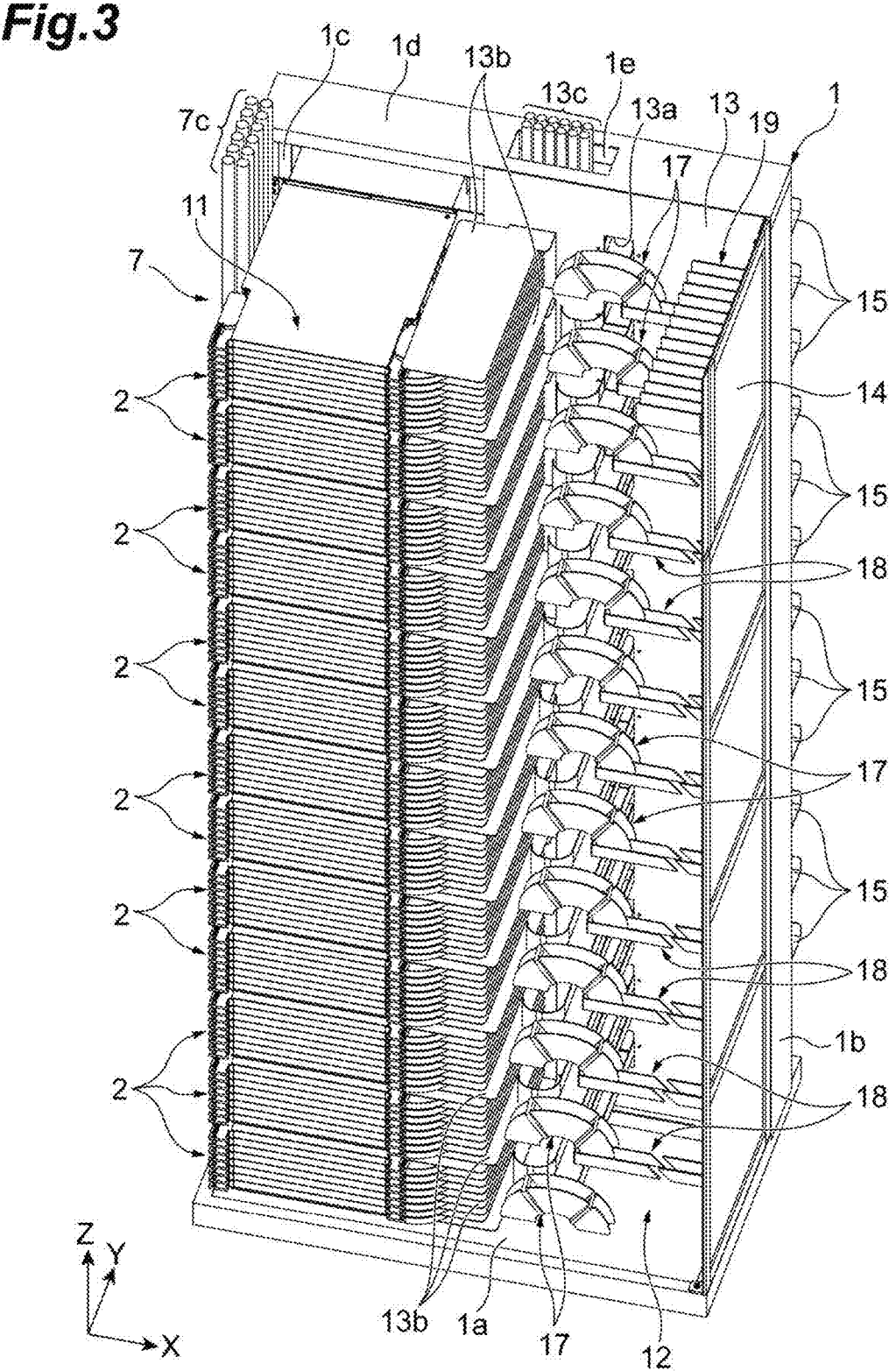
FIG. 3 is a schematic perspective view illustrating the optical fiber racks according to the embodiment.
Figure 4:
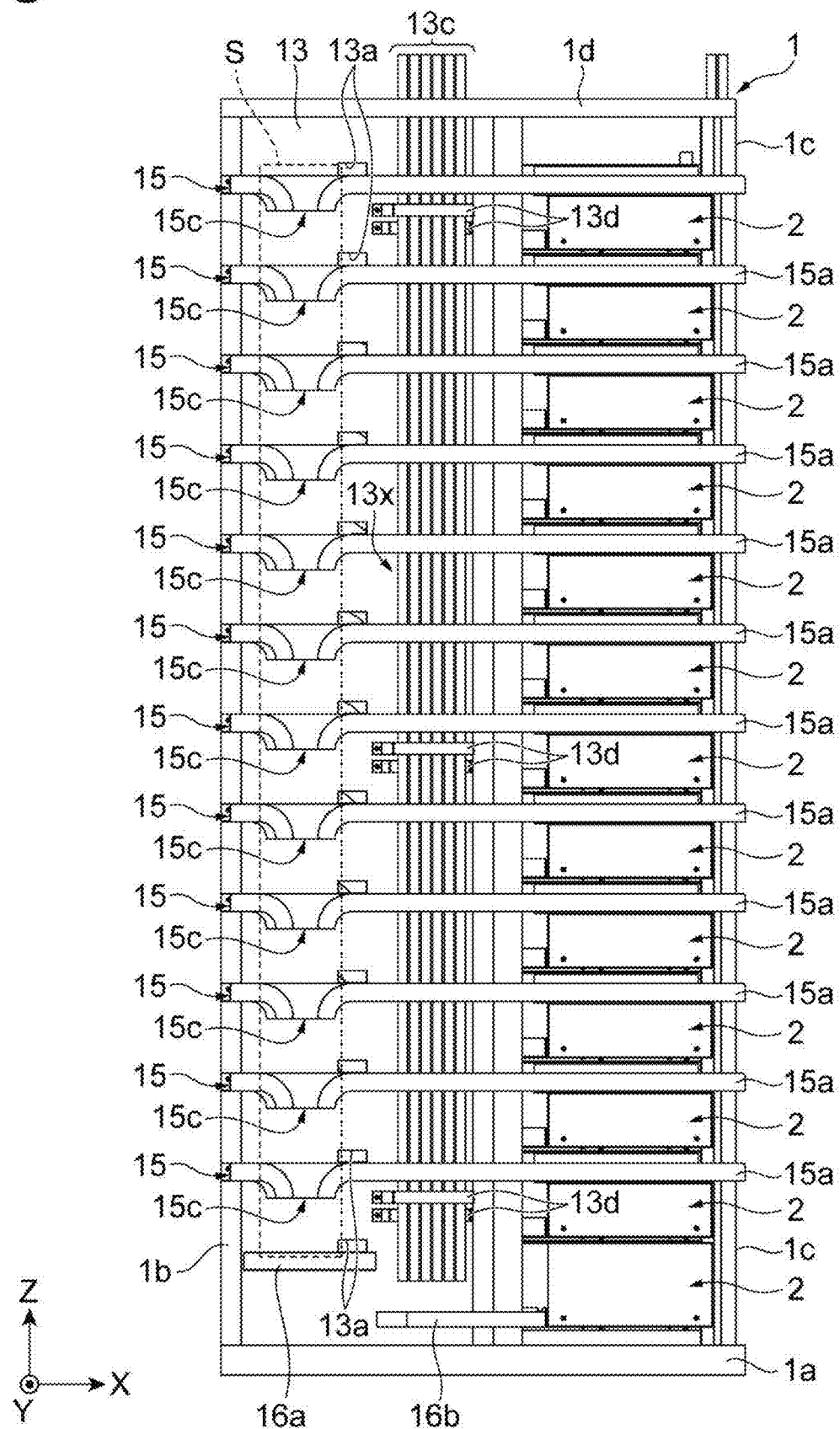
FIG. 4 is a back side view illustrating the optical fiber racks according to the embodiment.

FIG. 1 is a view illustrating a state where the optical fiber racks according to the embodiment are arranged along one direction, and FIG. 2 is a view when FIG. 1 is viewed from a back side. FIG. 3 is a schematic perspective view illustrating the optical fiber racks according to the embodiment, and FIG. 4 is a back side view illustrating the optical fiber racks according to the embodiment. In FIGS. 1 to 4, all the optical fiber cables (optical fibers) are omitted. Hereinafter, a direction in which a plurality of optical fiber racks 1 are arranged is a direction X (a right-left direction, and the second direction in the present embodiment), a direction perpendicular (for example, orthogonal) to the direction X in a horizontal direction is a direction Y (a front-rear direction, and the first direction in the present embodiment), and a direction perpendicular (for example, orthogonal) to the direction X and the direction Y is a direction Z (up-down direction).

The optical fiber rack 1 illustrated in FIG. 1 to FIG. 4 is an apparatus used when terminating the optical fiber cable at a data center or the like, and is called an FDF (Fiber Distributing Frame), for example. In the optical fiber rack 1, a termination unit 2 (described later in detail) is located, which retains a multicore optical fiber, and houses a connection point. In the optical fiber rack 1, the multicore cable optically linked to the termination unit 2 is divided into a plurality of optical fibers and subjected to line-arrangement. The multicore cable is an optical fiber having several tens to several hundreds of core wires. In the embodiment, the multicore cable has 288 core wires.

Next, a description is given of a specific configuration of the optical fiber rack 1. The optical fiber rack 1 is composed of a bottom frame part 1a as a pedestal, a pair of vertical frame parts 1b and 1c extending from the bottom frame part 1a in the direction Z, and a top frame part 1d provided on top faces of the vertical frames parts 1b and 1c, and has a frame like shape. The optical fiber rack 1 includes a rack part 11, an optical fiber housing part 12, a partition plate 13, a lateral plate 14, a plurality of rails 15, trays 16a and 16b, a plurality of optical fiber guides 17, a plurality of first dividing members 18, and a second dividing member 19.

The rack part 11 is a part on which a plurality of termination unit 2 arranged in the direction Z are located. In the rack part 11, a plurality of shelf plates, not illustrated in the figure, are provided in the vertical direction, for example, and the termination unit 2 is located on each shelf plate.

Figure 5A:
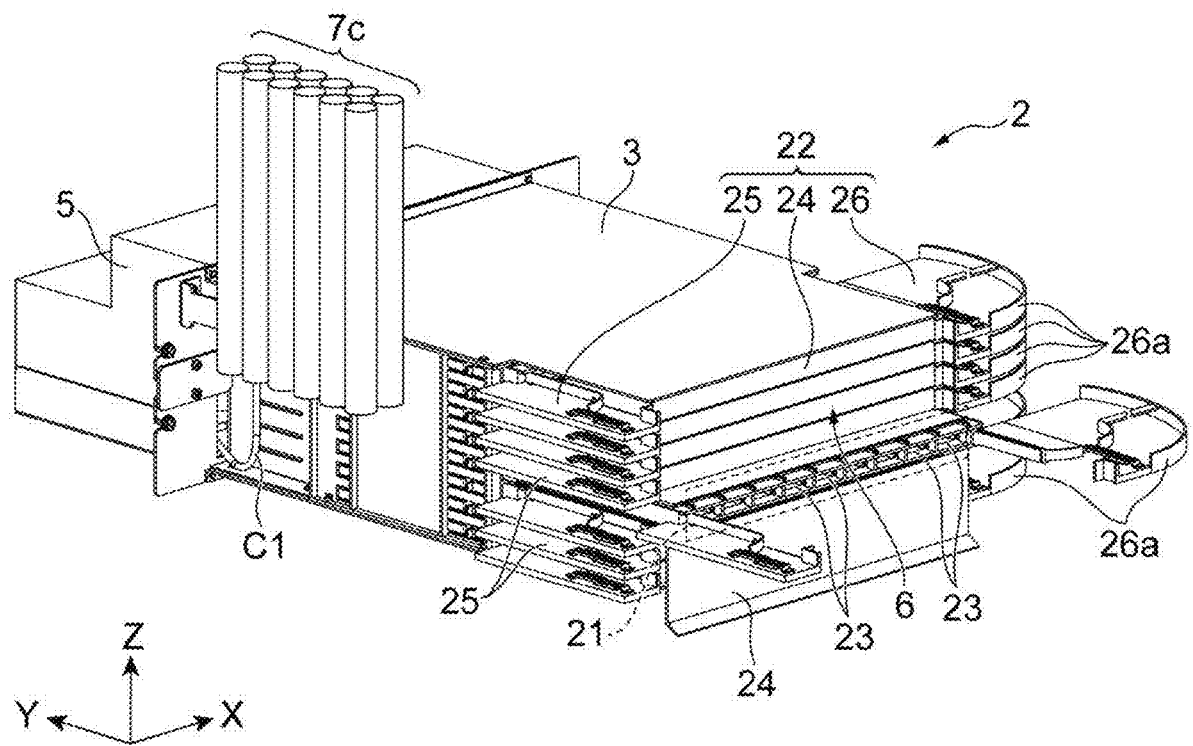
FIG. 5A is a front side perspective view of a termination unit.
Figure 5B:
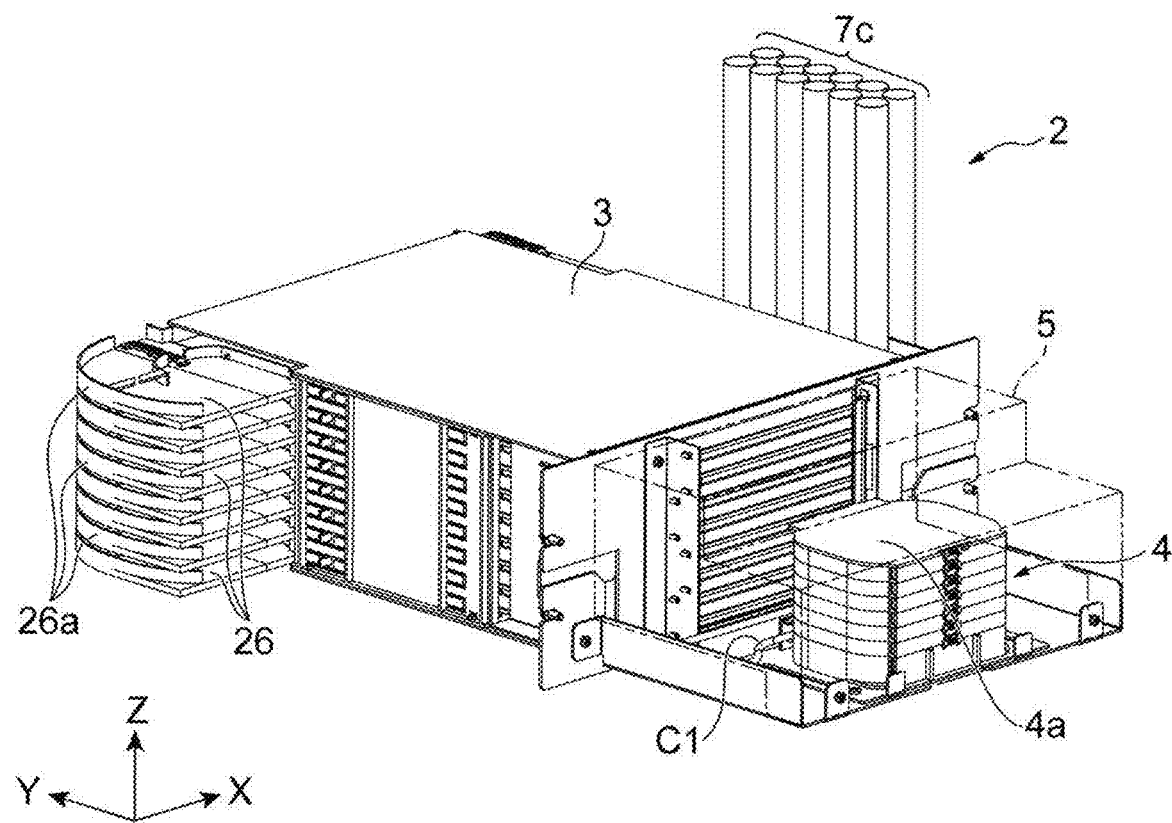
FIG. 5B is a back side perspective view of the termination unit.
Figure 6:
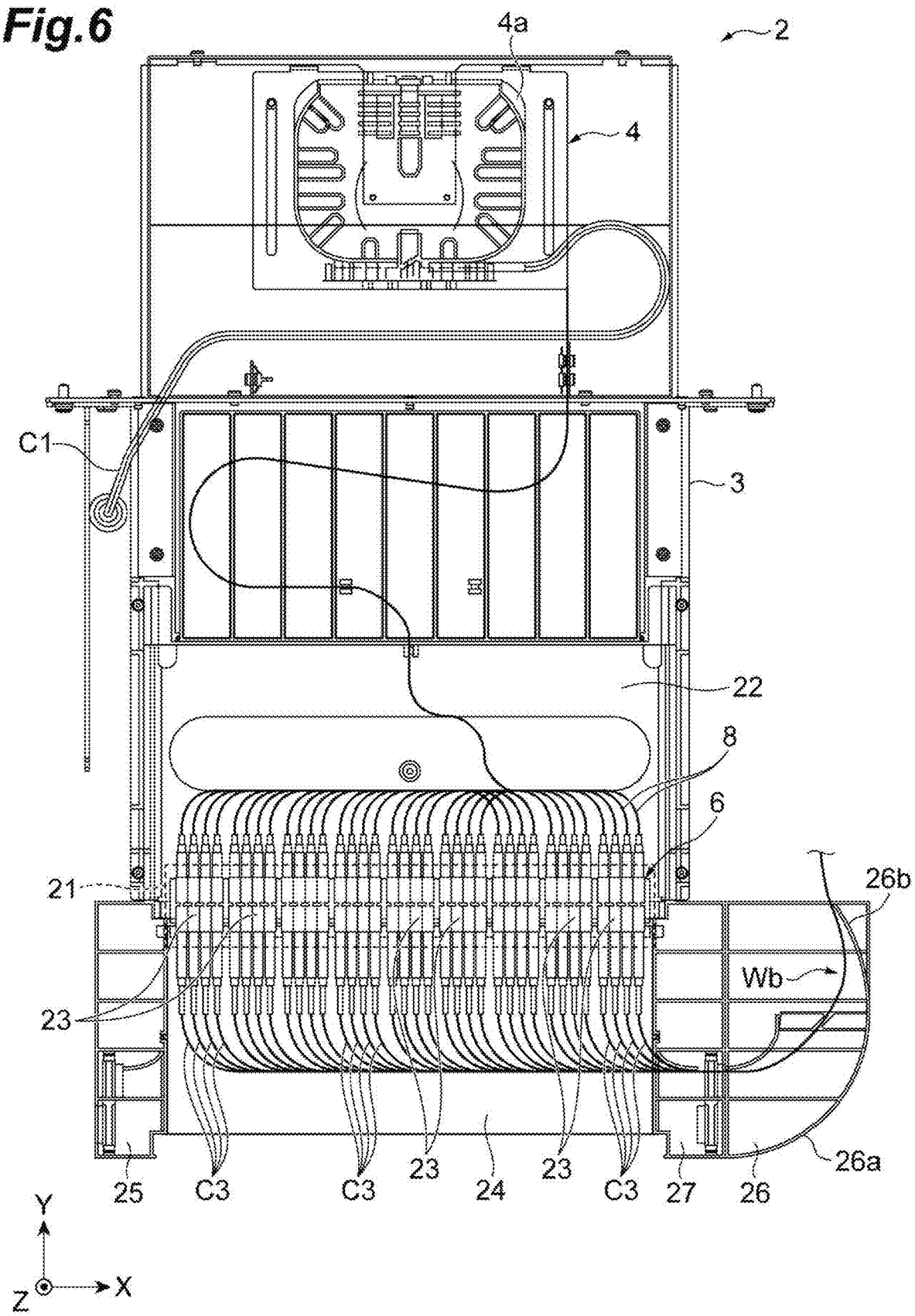
FIG. 6 is a view illustrating a part of an inner side of the termination unit.
Figure 7:
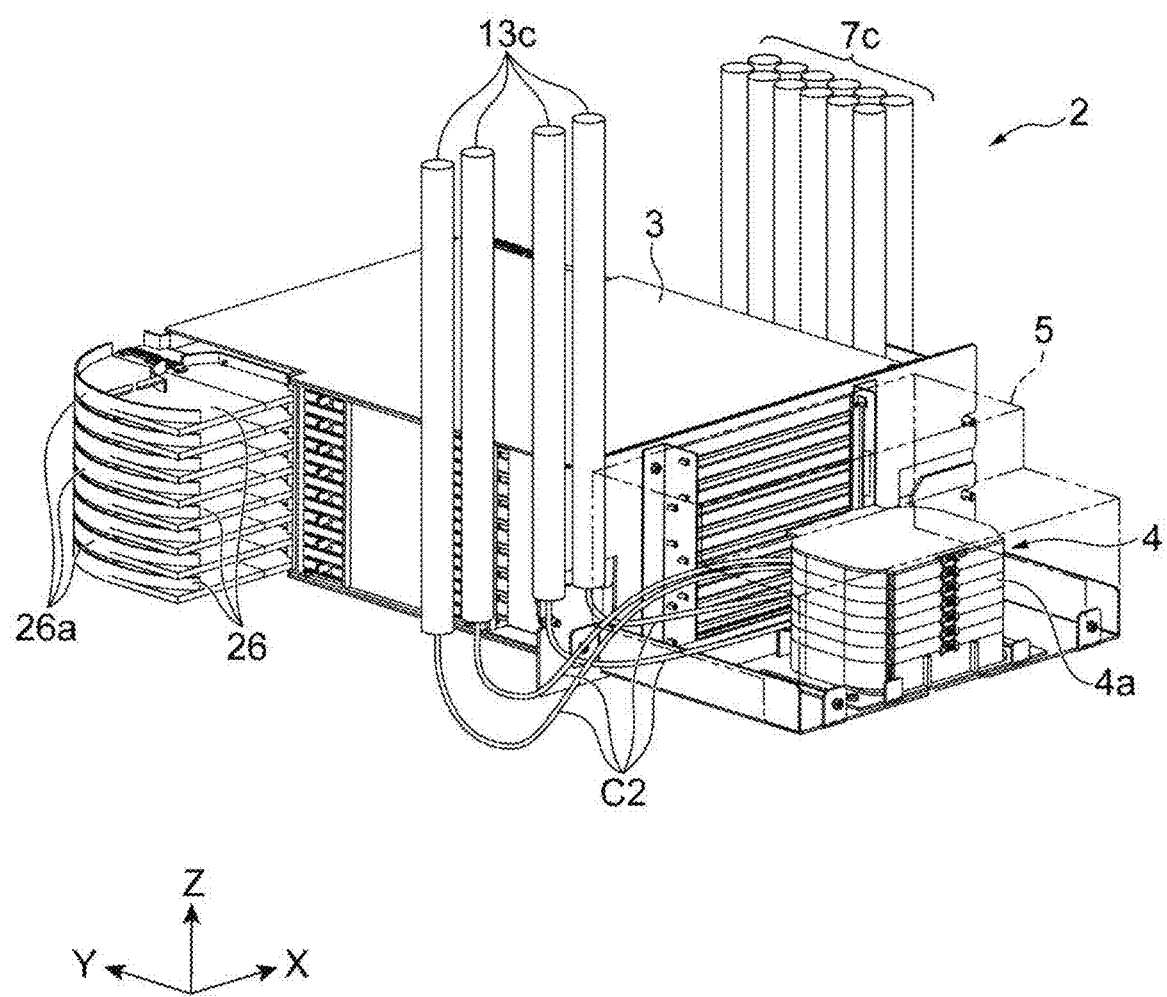
FIG. 7 is a view illustrating the termination unit positioned at a lowermost side in a rack part.

Here, a description is given of functions and a structure of the termination unit 2 with reference to FIGS. 5A to 7. FIG. 5A is a front side perspective view of the termination unit 2. FIG. 5B is a back side perspective view of the termination unit 2. FIG. 6 is a view illustrating a part of an inner side of the termination unit 2. FIG. 7 is a view illustrating the termination unit 2 positioned at a lowermost side in the rack part 11. As illustrated in FIGS. 5A, 5B, and 6, the termination unit 2 includes a main body part 3 formed into substantially a rectangular parallelepiped shape, a first external connection part 4 provided on a rear end side of the main body part 3, a lid part 5 that covers the first external connection part 4, a second external connection part 6 provided on a front end side of the termination unit 2 in the direction Y, and a plurality of coated optical fibers 8 with connector (first optical fibers) provided in the main body part 3.

The first external connection part 4 is a part where the multicore cable that extends from a fusion rack or the like, for example, is introduced, and the multicore cable is a part optically linked to the termination unit 2. The first external connection part 4 has a fusion tray 4a that houses parts at which the optical fibers are fused to each other. In the fusion tray 4a, any one of a coated optical fiber C1 of a multicore cable 7c housed in a cable housing part 7 and a coated optical fiber C2 of the multicore cable (hereinafter, referred to as a local fusion cable 13c) not housed in the cable housing part 7, and one end of the plurality of coated optical fibers 8 with connector are optically linked by fusion. In the present embodiment, the coated optical fiber C1 housed in the multicore cable 7c is introduced into the first external connection part 4 in the termination unit 2 other than the lowermost termination unit 2. On the other hand, the coated optical fiber C2 housed in the local fusion cable 13c is introduced into the first external connection part 4 in the lowermost termination unit 2, as illustrated in FIG. 7. The fusion may be conducted after the termination unit 2 is located in the rack part 11, or before the termination unit 2 is located in the rack part 11. In the present embodiment, in the lowermost termination unit 2, the fusion is conducted after the termination unit 2 is located in the rack part 11.

The lid part 5 is a lid covering the first external connection part 4. The lid part 5 is detachably attached to the main body part 3.

The second external connection part 6 is a part for optically linking the other end of the plurality of coated optical fibers 8 with connector to a bundle (hereinafter, referred to as an optical fiber bundle Wb) of optical fibers C3 (second optical fibers) connected with an external device or the like (for example, a server). The second external connection part 6 includes a plurality of adapter groups 21 stacked on each other, and a plurality of trays 22 dividing and protecting the respective adapter groups 21. Each of the adapter groups 21 includes a plurality of adapters 23 for optically linking the plurality of coated optical fibers 8 with connector to the plurality of optical fibers C3. Each of the optical fibers C3 that configures the optical fiber bundle Wb is connected from one end side of each of the adapters 23 in the direction Y. The plurality of coated optical fibers 8 with connector are connected from the other end side of each of the adapters 23 in the direction Y. The plurality of adapters 23 included in each of the adapter groups 21 are provided side by side in a line along the direction X on the tray 22.

Figure 8:
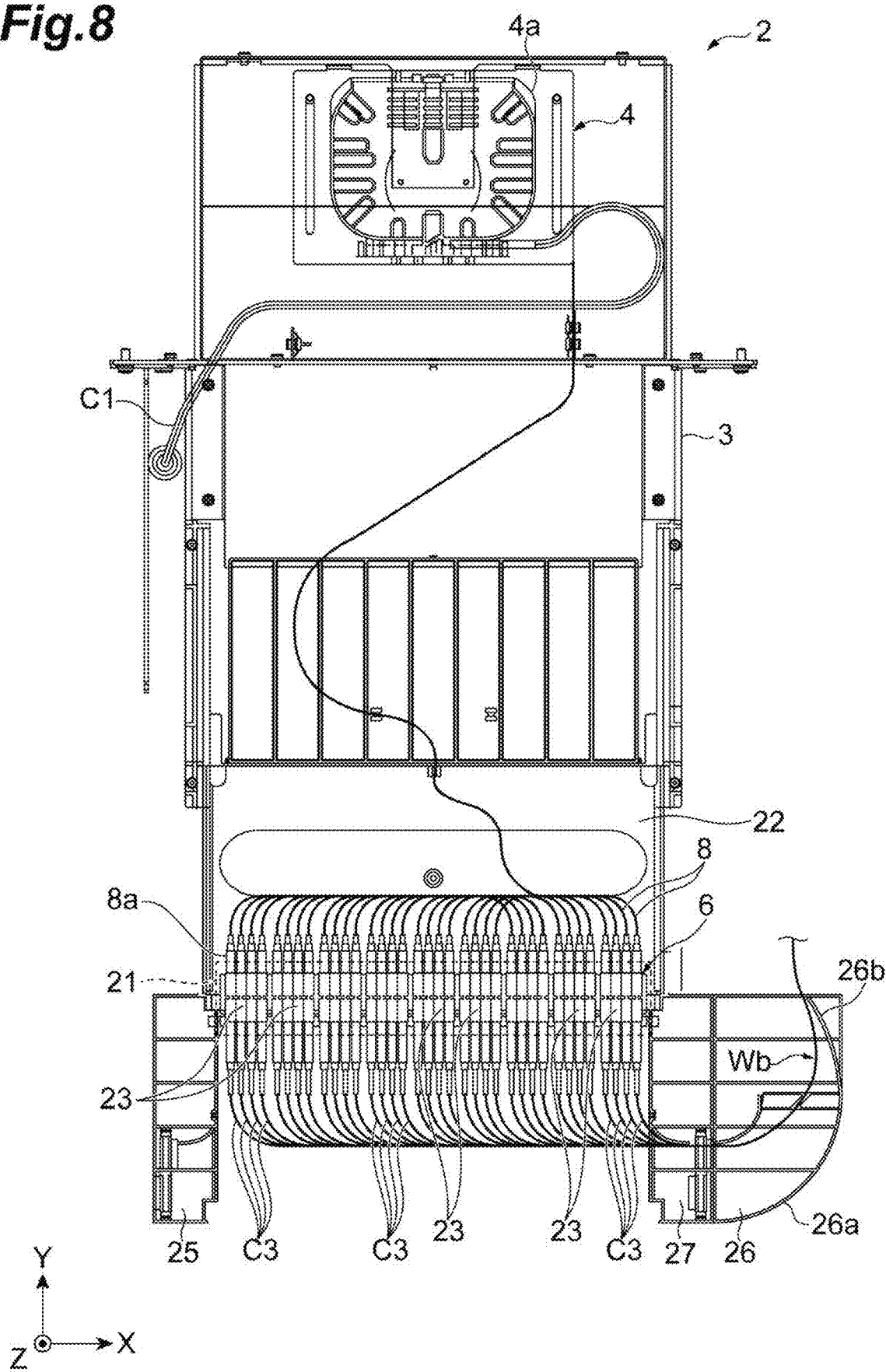
FIG. 8 is a view illustrating a state where a tray is pulled out.

Each of the trays 22 is positioned below the corresponding adapter group 21 and is integrally formed with the adapter group 21. Each of the trays 22 is provided to be slidable (to be pulled out) in the front-rear direction. Therefore, in conjunction with the sliding operation of the tray 22, the corresponding adapter group 21 is pulled out. FIG. 8 illustrates a state where the tray 22 is pulled out.

The tray 22 includes a cover part 24 that protects the one end side (outside of connection ends to which the plurality of optical fibers C3 are connected) in each of the adapters 23, and support parts 25 and 27 that support the cover part 24. The cover part 24 includes a substantially quadrangular plate-like part that extends along an XY plane and a plate-like part provided at the front end edge of the substantially quadrangular plate-like part and extending along a ZX plane. The cover part 24 is locked and supported by the support parts 25 and 27 which are arranged with the cover part 24 in the direction X. A rear edge of the cover part 24 is rotatable around a shaft that extends along the direction X as a supporting shaft. Therefore, the tray 22 is slid in the direction (that is, the front direction) from the other end side of the adapter 23 to one end side, and the cover part 24 can rotate downward by releasing the locked state of the support parts 25 and 27 from the cover part 24. In one example, a rotation angle of the cover part 24 is 90°. Accordingly, since it is possible to move the cover part 24 positioned around the outside connection end of the pulled-out adapter 23, it becomes easy to connect the optical fiber C3 to the connection end.

When the tray 22 is slid forward, the optical connector of the optical fiber C3 connected to the outside connection end of the adapter 23 may project forward from the front end surface of the termination unit 2. For this, the supporting shaft of the cover part 24 may be located immediately below the outside connection end of the adapter 23 or behind the connection end. The structure for locking the support parts 25 and 27 to the cover part 24 and the structure for releasing the locked state are not particularly limited. For example, the structure may be a structure in which the locked part is released in a case where the external force by the operator exceeds a predetermined size, or a structure in which the locked part is released by the operation of a knob or the like by the operator. In the present embodiment, a pair of support parts 25 and 27 is provided on both sides of the cover part 24 in the direction X, but the support part may be provided only on one side of the cover part 24. The rotation angle of the cover part 24 is not limited to 90°, and may be any angle.

The tray 22 further includes a support part 26 (first support part) provided integrally with the support part 27. The support part 26 is provided at a position sandwiching the support part 27 with the cover part 24. The support part 26 is positioned on the optical fiber housing part 12 with respect to the adapter group 21 and supports the optical fiber bundle Wb extended from the adapter group 21. In one example, the support part 26 is flat and has a flat surface shape, such as a substantially fan shape, when viewed from the direction Z. The support part 26 locates the optical fiber bundle Wb on the plate surface. The support part 26 has a guide 26a which is a part for guiding the optical fiber bundle Wb toward the support part 13b (refer to FIG. 3). The guide 26a is a wall-like part provided along the outer edge of the support part 26 to prevent the optical fiber bundle Wb from falling off the support part 26.

A part 26b on the side closer to the support part 13b in the guide 26a may extend in a direction of approaching the tray 22, that is, a direction of slightly being inclined to a negative side in the direction X with respect to the direction Y. Furthermore, an inclined angle from the direction Y of the part 26b may be 5° to 30°. Inclination by 5° or more makes it easier to guide the optical fiber bundle Wb toward the support part 13b. By setting the inclination to 300 or less, the optical fiber bundle Wb can be easily guided in the direction along the direction Y without excessive gradient.

The second external connection part 6 may be optically linked to an optical fiber (a second optical fiber) other than the optical fiber C3. For example, the optical fiber (a cross-connect optical fiber) may be optically linked for connecting the termination units 2 different from each other. A combination of the termination units 2 different from each other may be a combination of the different termination units 2 located in one optical fiber rack 1, or a combination of the termination unit 2 located in an optical fiber rack 1 and the termination unit 2 located in another optical fiber rack 1.

The cable housing part 7 is an area in which the multicore cable 7c is housed, and provided on the left side of the main body part 3, that is, on an opposite side or on the same lateral side of the support part 26. As illustrated in FIG. 3, in view of improving workability of wiring the optical fiber bundle Wb in the optical fiber housing part 12, the multicore cable 7c may be disposed on the opposite side of the optical fiber housing part 12 with respect to the rack part 11.

The coated optical fiber 8 with connector is a cluster of single core optical fiber cables. One end of the coated optical fiber 8 with connector is bundled and housed in the fusion tray 4a, and is fused to the coated optical fiber C1 housed in the multicore cable 7c as described above. The other end of the coated optical fiber 8 with connector is provided with the optical connector 8a, and the optical connector 8a is connected to the other end side of the adapter 23.

Figure 9:
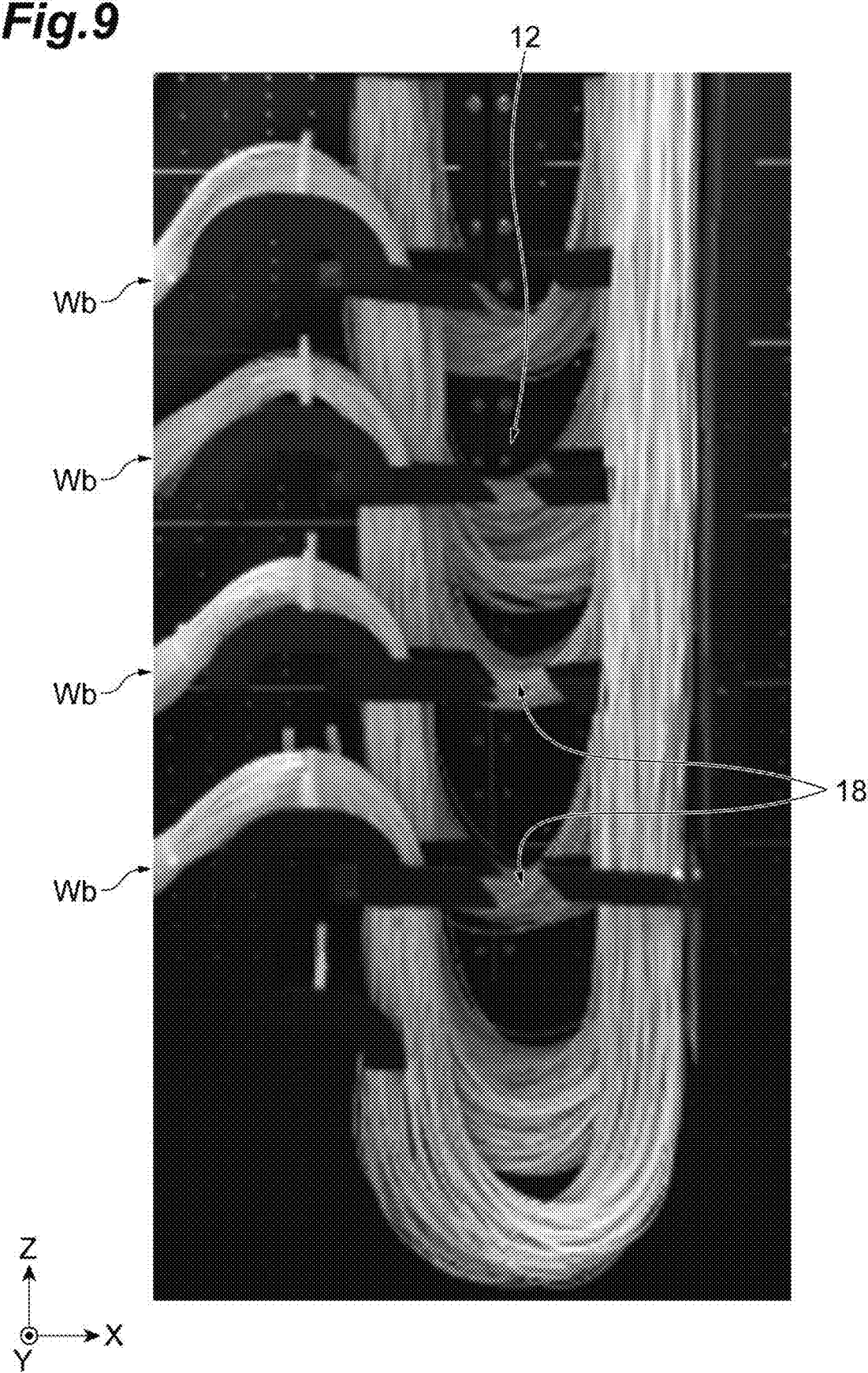
FIG. 9 is a photograph illustrating a state where an extra length wiring part of an optical fiber bundle is housed in an optical fiber housing part.

Returning to FIGS. 1 to 4, the optical fiber housing part 12 is positioned next to the rack part 11 in the direction X, and houses the extra length wiring part of the optical fiber bundle Wb connected to the termination unit 2 (refer to FIG. 6). In the optical fiber housing part 12, a plurality of optical fiber bundles Wb are respectively divided by the plurality of the first dividing members 18 and the second dividing members 19. FIG. 9 is a photograph illustrating a state where the extra length wiring part of the optical fiber bundle Wb is housed in the optical fiber housing part 12. As illustrated in FIG. 9, the extra length wiring part of the optical fiber bundle Wb is housed in a state of sagging in a U-shape, for example.

The partition plate 13 is a plate-like member provided to partition the optical fiber housing part 12 into a front part and a rear part in the direction Y. The partition plate 13 is fixed by the bottom frame part 1a, the vertical frame part 1b, and the top frame part 1d, for example. The partition plate 13 is provided with a plurality of openings 13a, a plurality of thin support parts 13b (second support part), and a cable housing part 13x. The plurality of openings 13a are provided to lay the optical fibers from a front surface side of the partition plate 13 toward a back surface side thereof, or lay the optical fibers from the back surface side of the partition plate 13 toward the front surface side thereof, for example. A plurality of openings 13a are provided side by side in a line along the direction Z.

The support part 13b is a plate-like member that supports the optical fiber bundle Wb that extends from the support part 26 (refer to FIG. 6) of the corresponding termination unit 2 to the optical fiber housing part 12. The support part 13b is provided side by side in a line along the direction Y with respect to the support part 26, and is provided behind the support part 26 in the present embodiment. The support part 13b is separate from the tray 22 and is not interlocked with the sliding operation of the tray 22. In one example, the support part 13b is attached to the front surface of the partition plate 13. The support part 13b is provided closer to the rack part 11 side than the opening 13a. In view of preventing the optical fiber bundle Wb from inhibiting the sliding operation of the tray 22, the extra length wiring part of the optical fiber bundle Wb may be provided on the support part 13b.

The support part 13b has a flat surface on which the optical fiber bundle Wb is placed, and supports the optical fiber bundle Wb in an extensible manner. In the present embodiment, since the support part 13b is flat, the flat surface of the support part 13b extends to the edge of the support part 13b on the optical fiber housing part 12 side. In other words, the edge of the support part 13b on the optical fiber housing part 12 side is not provided with a wall-like part, such as the guide 26a of the support part 26.

Returning to FIGS. 1 to 4 again, the cable housing part 13x is an area in which the local fusion cable 13c is housed, and is attached to the back surface of the partition plate 13, for example, via a fixing member 13d. The cable housing part 13x extends along the direction Z from the vicinity of the bottom frame part 1a through an opening 1e provided in the top frame part 1d to exceed the top frame part 1d, for example.

The lateral plate 14 is a plate-like member provided to divide the optical fiber racks 1 in the direction X. The lateral plate 14 is positioned on the opposite side of the rack part 11 with respect to the optical fiber housing part 12, and is fixed to the bottom frame part 1a and the vertical frame part 1b or the partition plate 13.

The plurality of rails 15 are members that guide the optical fibers laid on the back side of the partition plate 13. Each of the plurality of rails 15 is formed into a substantially U-shaped groove shape that extends in the direction X. One end of each of the rails 15 is attached to the vertical frame part 1b, and the other end of each of the rails 15 is attached to the vertical frame part 1c. One end and the other end of the rail 15 have shapes capable of being coupled with each other. Therefore, in a case where the optical fiber racks 1 are arranged along the direction X, the rails 15 of the optical fiber racks 1 adjacent to each other can be coupled with each other. In the direction Y, the partition plate 13 and the cable housing part 13x and the rail 15 are separated from each other. Therefore, the contact between the optical fibers laid on the rail 15 and the coated optical fiber C2 housed in the local fusion cable 13c in the cable housing part 13x can be preferably suppressed.

The rail 15 includes a main part 15a that extends along the direction X, a branch part 15b that branches and extends from the main part 15a, and a disconnect part 15c where a part of the main part 15a is disconnected. The branch part 15b is a part that extends from the main part 15a toward the corresponding opening 13a along the direction Y. The disconnect parts 15c are provided on the back side of the optical fiber housing part 12 with respect to the partition plate 13 to side by side in a line in the direction Z. A part that forms the disconnect part 15c in the main part 15a is curved toward the bottom frame part 1a. As the disconnect part 15c is formed, the optical fibers (for example, cross-connect optical fibers) positioned on the back side of the partition plate 13 can be laid on a plurality of rails, and the extra length wiring parts of the optical fibers can be provided. In other words, on the rear side of the optical fiber housing part 12 with respect to the partition plate 13, a housing part S (second optical fiber housing part) can be provided in which the extra length wiring part of the optical fiber different from the optical fiber C3 in the optical fiber bundle Wb is housed.

The trays 16a and 16b are members on which the extra length wiring part of the optical fiber positioned on the back side of the partition plate 13 is placed, and are attached to the back surface of the partition plate 13. The tray 16a is provided between the disconnect part 15c of the rail 15 near the lowermost bottom frame part 1a in the direction Z and the bottom frame part La. Therefore, the extra length wiring part of the optical fiber provided in the disconnect part 15c can be located on the tray 16a. The tray 16b is provided between a lower region of the cable housing part 13x and the bottom frame part La in the direction Z. Therefore, the extra length wiring part of the coated optical fibers C2 housed in the local fusion cable 13c that extends from the cable housing part 13x to the termination unit 2 can be located on the tray 16b.

Figure 10:
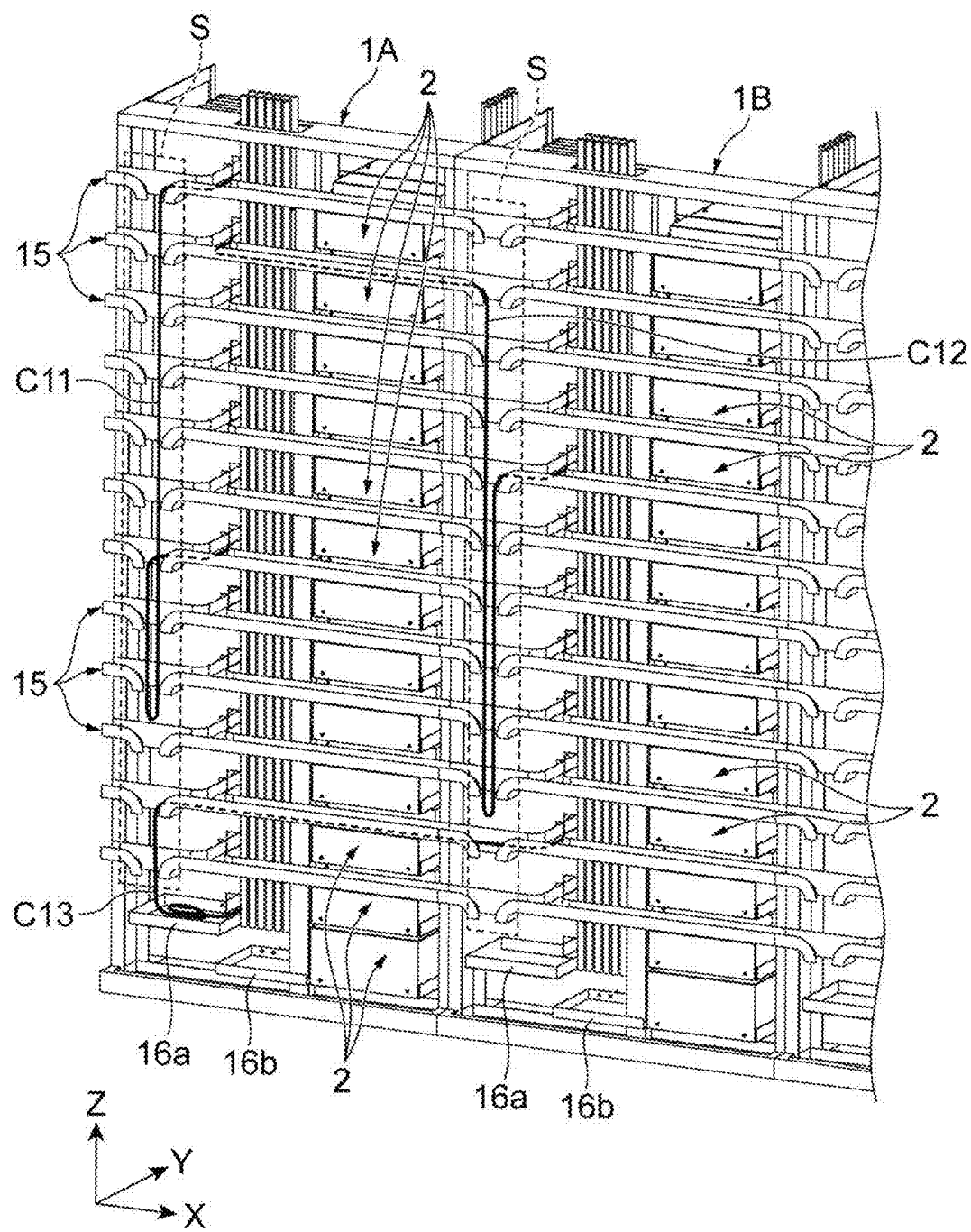
FIG. 10 is a view illustrating an example in which cross-connect optical fibers are laid.

FIG. 10 is a diagram illustrating an example in which the cross-connect optical fibers are laid. Assume, in the optical fiber rack 1 illustrated in FIG. 10, that a rack at the endmost side in the direction X is an optical fiber rack 1A, and a rack next to the optical fiber rack 1A is an optical fiber rack 1B. FIG. 10 illustrates cross-connect optical fibers C11 to C13 laid on the rails 15. The cross-connect optical fiber C11 optically links the different termination units 2 on the optical fiber rack 1A to each other. Specifically, the cross-connect optical fiber C11 optically links the second external connection part 6 of the termination unit 2 located on an uppermost side of the optical fiber rack 1A to the second external connection part 6 of the termination unit 2 the sixth from the top of the optical fiber rack 1A. An extra length wiring part of the cross-connect optical fiber C11 is provided in the housing part S of the optical fiber rack 1A. The cross-connect optical fibers C12 and C13 optically link the termination unit 2 located on the optical fiber rack 1A to the termination unit 2 located on the optical fiber rack 1B. Specifically, the cross-connect optical fiber C12 optically links the termination unit 2 the second from the top of the optical fiber rack 1A to the termination unit 2 the fourth from the top of the optical fiber rack 1B. On the other hand, the cross-connect optical fiber C13 optically links the termination unit 2 the second from the bottom of the optical fiber rack 1A to the termination unit 2 the fourth from the bottom of the optical fiber rack 1B. An extra length wiring part of the cross-connect optical fiber C12 is provided in the housing part S of the optical fiber rack 1B. An extra length wiring part of the cross-connect optical fiber C13 is put on the tray 16a of the optical fiber rack 1A.

Figure 11:
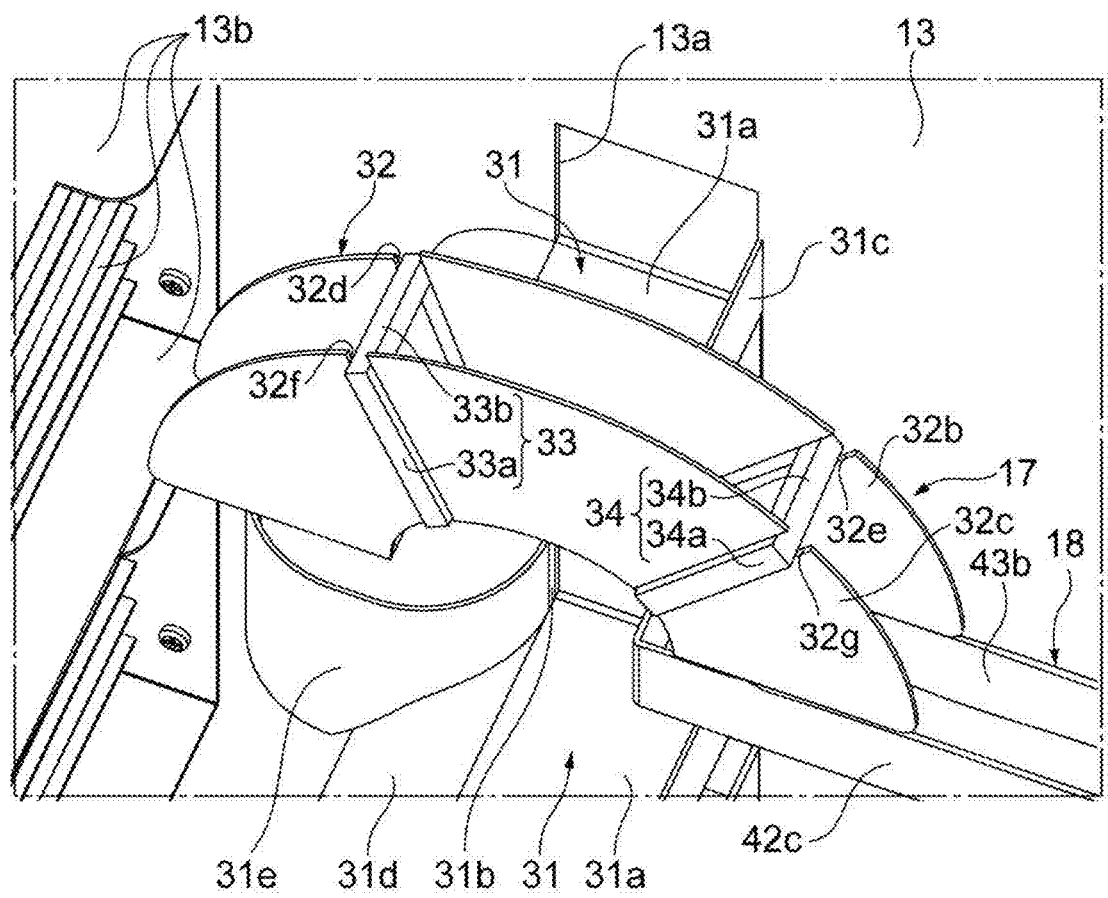
FIG. 11 is an enlarged perspective view of an optical fiber guide.
Figure 12:
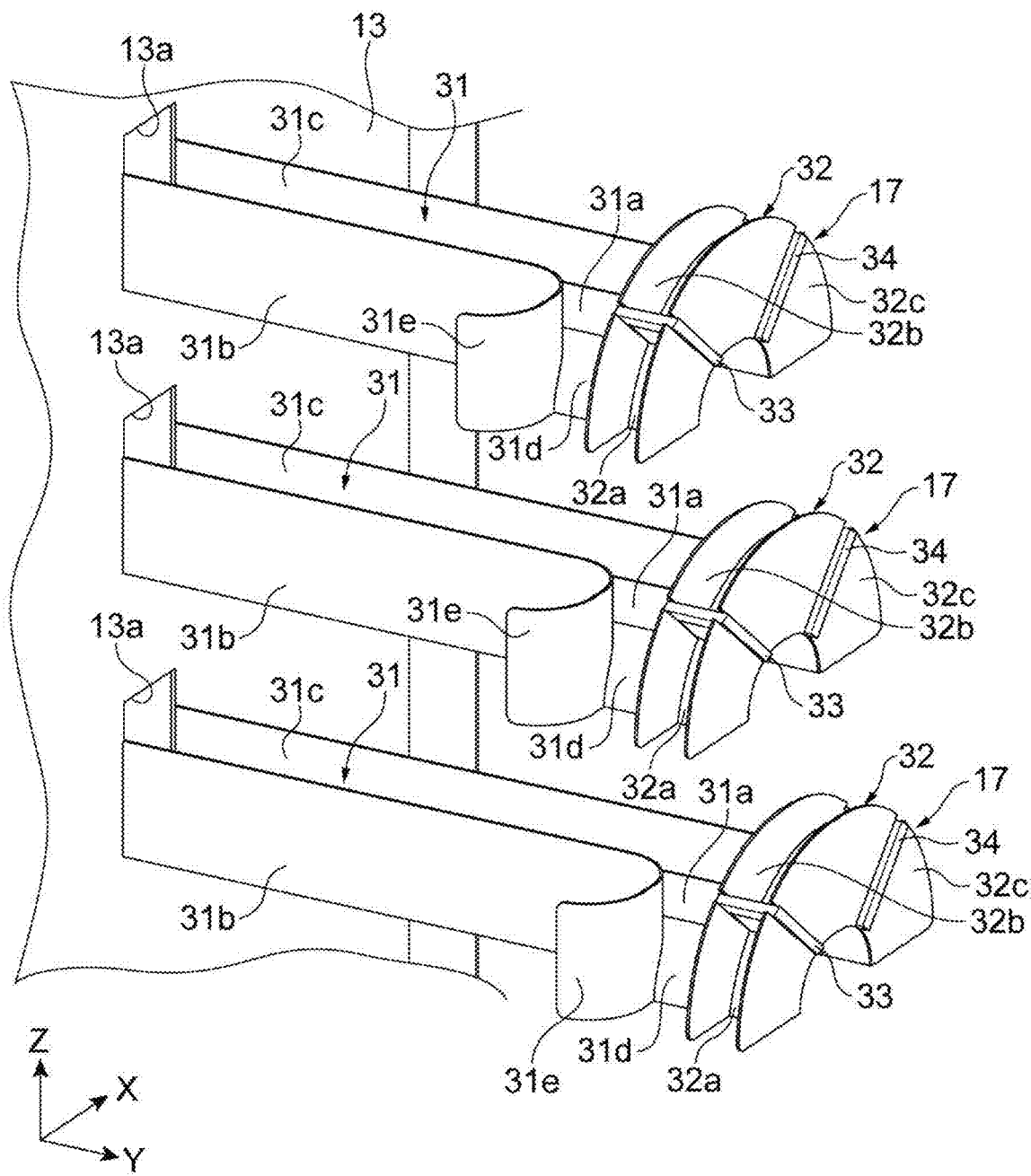
FIG. 12 is an enlarged view of a main part of the optical fiber guide.

Returning to FIGS. 1 to 4, the plurality of optical fiber guides 17 are members for guiding the optical fiber connected to the second external connection part 6 of the termination unit 2 to the optical fiber housing part 12, and are attached to the front surface of the partition plate 13 between the support part 13b and the optical fiber housing part 12. The optical fiber guide 17 is arranged along the direction Z so as to correspond to the termination unit 2. Here, the structure of the optical fiber guide 17 will be described with reference to FIGS. 11 and 12. FIG. 11 is an enlarged perspective view of the optical fiber guide 17, and FIG. 12 is an enlarged view of a main part of the optical fiber guide 17. As illustrated in FIGS. 11 and 12, the optical fiber guide 17 includes a guide part 32 (first guide part) that houses the optical fiber C3 (for example, optical fiber bundle Wb) oriented toward the optical fiber housing part 12, a guide part 31 (second guide part) that houses the optical fiber (for example, cross-connect optical fiber that is the second optical fiber) passing through the opening 13a of the partition plate 13, and a restriction part 33 that restricts a motion of the optical fiber C3 in the direction Z.

The guide part 31 is a part attached to the front surface of the partition plate 13. To be more specific, the guide part 31 is a part attached to the front surface in the vicinity of the corresponding opening 13a on the partition plate 13. The guide part 31 has a substantially U-shaped groove shape that extends along the direction Y. The guide part 31 has a bottom part 31a, a sidewall part 31b positioned on the rack part 11 side, and a sidewall part 31c positioned on the optical fiber housing part 12 side. At least a part of the sidewall part 31b in the guide part 31 is cutoff. A slope part 31d is provided which extends on the rack part 11 side along the direction X from the bottom part 31a that is not provided with the sidewall part 31b in the guide part 31. The slope part 31d is curved downward from the bottom part 31a toward the rack part 11 in the direction X. A front end part in the sidewall part 31b is provided with a curved plate 3e that restricts a position of the optical fiber being curved such that the second optical fiber is guided toward the guide part 31. The curved plate 31e is a plate-like member curved toward the front side when viewed from the direction Z. A curvature radius of the curved plate 31e viewed from the direction Z is greater than an allowable bending radius of the optical fiber guided by the guide part 31, for example. In this case, a part of the optical fiber in contact with the curved plate 31e can be prevented from bending to exceed the allowable bending radius to be broken.

The lengths of the respective guide parts 31 in the direction Y are not uniform and vary. Specifically, a dimension of the guide part 31 in the direction Y of the optical fiber guide 17 provided lower in the direction Z becomes longer. For example, the dimensions of the respective guide parts 31 in the direction Y are adjusted such that the guide parts 32 do not overlap each other in the direction Z.

The guide part 32 is a part provided at a leading end of the guide part 31 in the direction Y, and has a substantially U-shaped groove shape that extends to intersect the guide part 31. The guide part 32 has a bottom part 32a, a sidewall part 32b (wall part) positioned on the guide part 31 side, and a sidewall part 32c positioned on the opposite side of the sidewall part 32b with respect to the bottom part 32a. The bottom part 32a is curved upward when viewed from the direction Y. A curvature radius of the bottom part 32a viewed from the direction Y is greater than the allowable bending radius of the optical fiber in the optical fiber bundle Wb, for example. The sidewall part 32b is provided to divide between the guide part 31 and the guide part 32. Specifically, the sidewall part 32b is provided to divide not only between the bottom parts 31a and 32a but also between the slope part 31d and the bottom part 32a. The sidewall parts 32b and 32c are provided along a shape of the bottom part 32a, and have substantially the same shape. The sidewall part 32b is provided with a slit 32d on the rack part 11 side thereof, and the sidewall part 32c is provided with a slit 32e on the optical fiber housing part 12 side thereof. Similarly, the sidewall part 32c is provided with a slit 32f on the rack part 11 side thereof, and the sidewall part 32c is provided with a slit 32g on the optical fiber housing part 12 side thereof. The slits 32d and 32f are provided to face each other in the direction Y, and the slits 32e and 32g are provided to face each other in the direction Y.

Each of the restriction parts 33 and 34 is a member restricting a motion of the optical fiber bundle Wb housed in the guide part 32 in the direction Z. The restriction part 33 is provided to be housed in the slits 32d and 32f, and has a substantially rectangular frame shape. The restriction part 33 includes a main body part 33a substantially U-shaped, and a bar-like member 33b attached to an upper end of the main body part 33a. The main body part 33a is housed in the slits 32d and 32f to be substantially U-shaped seen in the direction X. One end of the bar-like member 33b is pivotably attached to one upper end of the main body part 33a, and the other end of the bar-like member 33b is caught together the other upper end of the main body part 33a. For example, the other end of the bar-like member 33b is inserted into a groove provided in the other upper end of the main body part 33a such that the restriction part 33 defines a frame shape. The restriction part 33 may have means for being fixed to the guide part 32 (e.g., a claw part or the like). The restriction part 34 has the same functions and shape as the restriction part 33, and is housed in the slits 32e and 32g. Therefore, the restriction part 34 includes a main body part 34a substantially U-shaped, and a bar-like member 34b attached to an upper end of the main body part 34a. The motion of the optical fiber bundle Wb in the direction Z is restricted such that the optical fiber bundle Wb is to be laid in the direction X and direction Y, and as a result, the motion of the optical fiber bundle Wb in a direction along the guide part 32 is restricted.

Here, a description is given of an example of a method of using the restriction part 33. First, the main body part 33a of the restriction part 33 is housed in the slits 32d and 32f. Next, the optical fiber bundle Wb is housed on the bottom part of the main body part 33a. At this time, the catching state of the other end of the bar-like member 33b for the main body part 33a is released to allow the optical fiber bundle Wb to be easily housed in the main body part 33a. Next, the bar-like member 33b is caught together the main body part 33a. This allows the optical fiber bundle Wb to be housed in a space defined by the restriction part 33 to be able to restrict the motion of the optical fiber bundle Wb in the direction Z. The restriction part 34 may be used by the same method as the restriction part 33.

The number of restriction parts may be one or may be at least two. In a case that the optical fiber is added to or reduced from the optical fiber bundle Wb, the optical fiber bundle Wb may be held to prevent an unexpected stress from being applied which is caused by the optical fiber bundle Wb already housed moving by its own weight when releasing the restriction part. In such a case, if there are at least two restriction parts, even if one restriction part is released unless the other is released, the optical fiber bundle Wb can be continuously held. For example, in the case that there are two restriction parts, after one restriction part is uncoupled to uncouple a part of the optical fibers from one restriction part, the one restriction part is caught together to hold the optical fiber bundle Wb, and then, the other restriction part is uncoupled to uncouple the part of the optical fibers from the other restriction part, so that the part of the optical fibers can be separated from the optical fiber bundle Wb. On the other hand, the optical fiber bundle Wb except for the optical fiber to be separated continuously keeps a state of being caught together to prevent an unexpected stress from applying. When adding the optical fiber, in a reverse procedure to the above, after one restriction part is uncoupled to catch together the optical fiber bundle Wb including the optical fiber be added by one restriction part, the other restriction part may be released from the caught state to catch together the optical fiber bundle Wb including the optical fiber to be added by the other restriction part.

Figure 13:
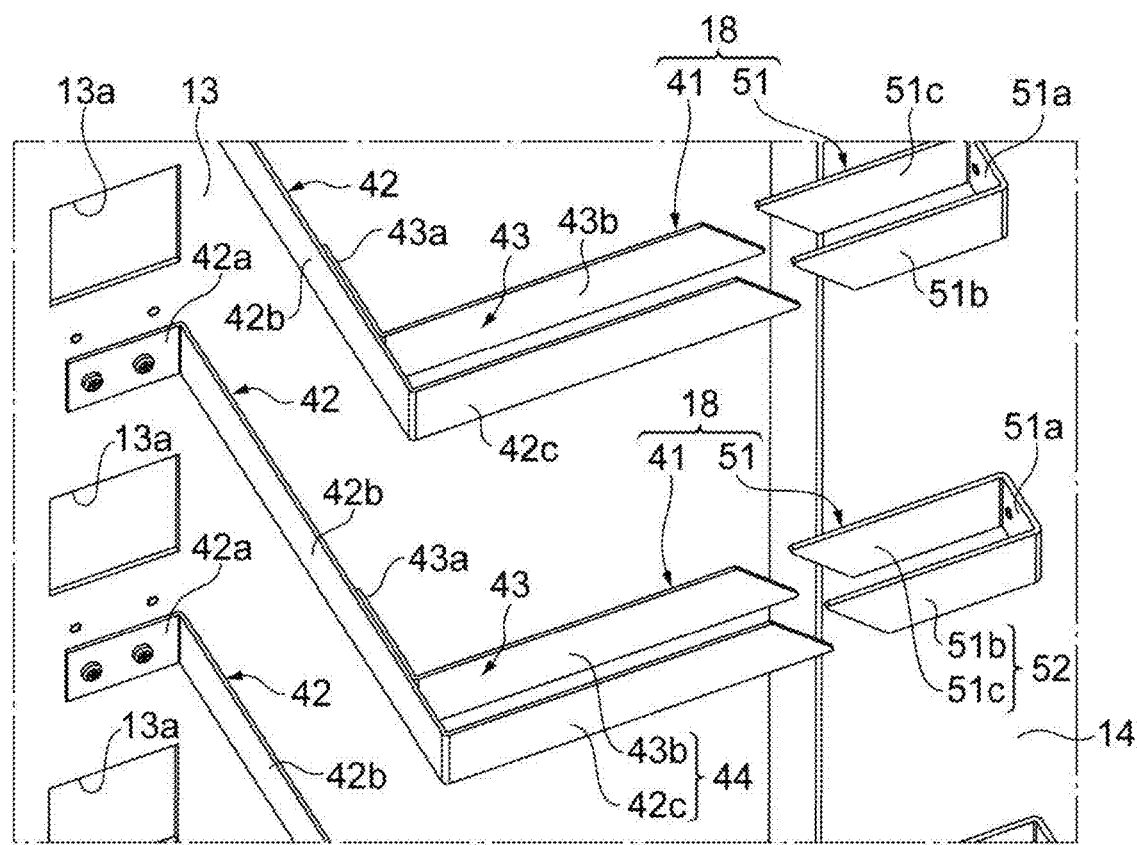
FIG. 13 is an enlarged view of a main part of a first dividing member.
Figure 13:
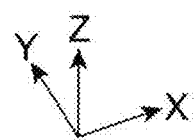
Figure 14:
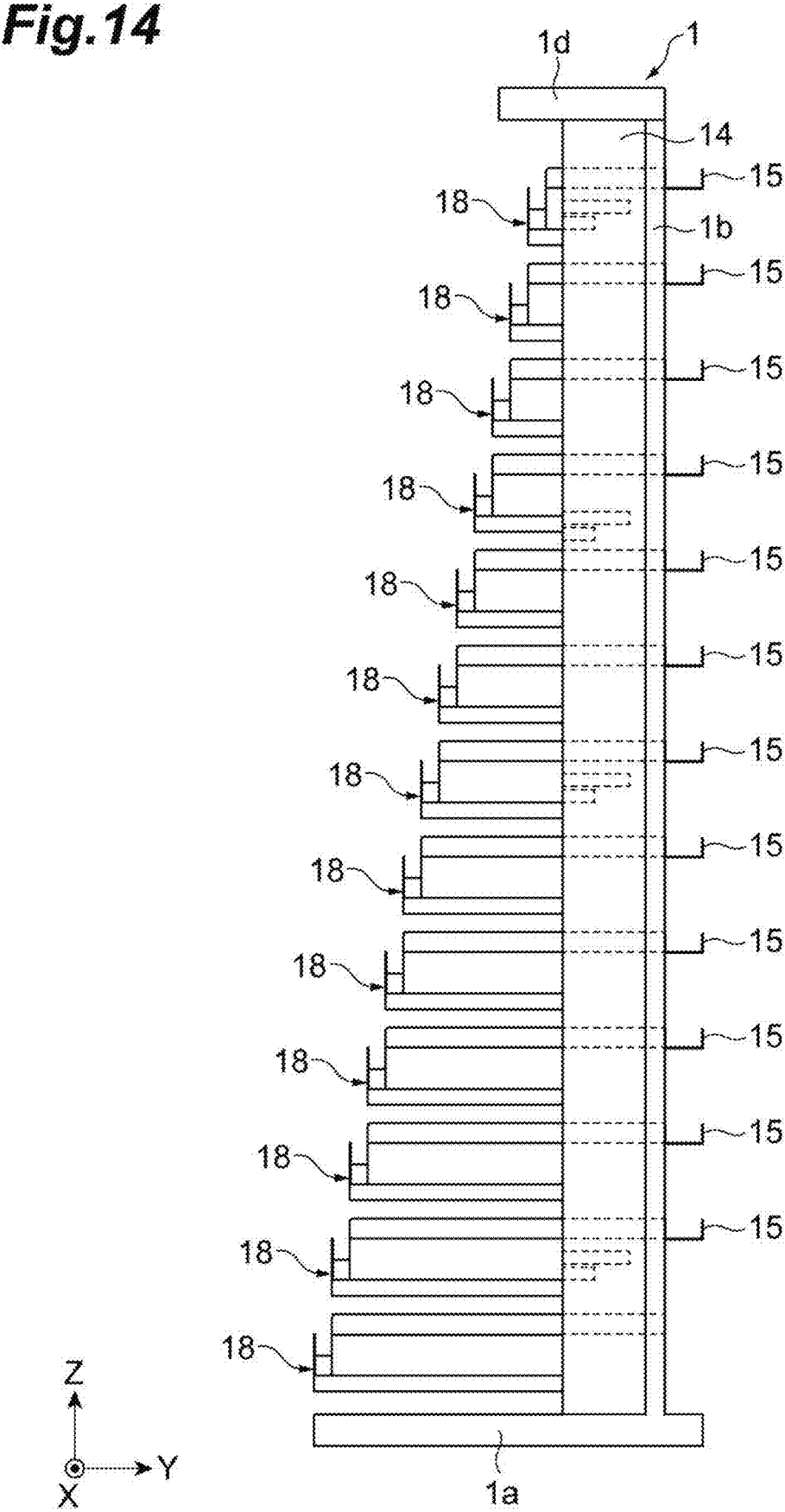
FIG. 14 is a schematic view of the optical fiber housing part when viewed from a lateral plate side along a direction Y.

FIG. 13 is a view in which a part of the first dividing member is extracted. FIG. 14 is a schematic view of the optical fiber housing part 12 viewed from the lateral plate 14 side along the direction Y. As illustrated in FIG. 9, the first dividing member 18 illustrated in FIG. 13 is also a member for dividing the position of the optical fiber bundle Wb in the optical fiber housing part 12. The plurality of first dividing members 18 are arranged along the direction Z in the optical fiber housing part 12 to correspond to the optical fiber guides 17. As illustrated in FIG. 14, the first dividing member 18 provided lower in the direction Z is positioned at a front part in the direction Y similar to the optical fiber guide 17. Each of the first dividing members 18 includes a first dividing body 41 attached to the front surface of the partition plate 13, and a second dividing body 51 attached to the lateral plate 14.

The first dividing body 41 is a part for dividing a part introduced from the optical fiber guide 17 to the optical fiber housing part 12 in the optical fiber bundle Wb housed in the optical fiber housing part 12. The first dividing body 41 is configured with a first bar-like member 42 and a second bar-like member 43, for example. The first bar-like member 42 includes a flange part 42a fixed to the front surface of the partition plate 13 via a fixing member, such as a screw, a middle part 42b that extends along the direction Y from the end of the flange part 42a on the lateral plate 14 side in the direction X, and a dividing part 42c (one first dividing bar) that crosses the direction Y from a front leading end of the middle part 42b and extends toward the lateral plate 14. The flange part 42a, the middle part 42b, and the dividing part 42c are provided by bending a member having a bar-like shape, for example. The flange part 42a is fixed below the corresponding optical fiber guide 17. A dimension of the middle part 42b provided lower in direction Z along the direction Y becomes longer. In the embodiment, the dividing part 42c extends along the direction X.

The second bar-like member 43 includes a flange part 43a attached to the middle part 42b, and a dividing part 43b (the other first dividing bar) that extends from the end on the dividing part 42c side in the flange part 43a in a direction intersecting the direction Y. The flange part 43a and the dividing part 43b are provided by bending a member having a bar-like shape, for example. The flange part 43a is attached to a surface of the middle part 42b facing the lateral plate 14 by an adhesive or the like, for example. The dividing part 43b is positioned closer to the partition plate 13 side in the direction Y than the dividing part 42c, and separated from the dividing part 42c in the direction Y.

The first dividing body 41 is continuously connected to the leading end of the guide part 32 of the corresponding optical fiber guide 17 on the optical fiber housing part 12 side. To be more specific, as illustrated in FIG. 11, the dividing part 42c is continuously connected to the leading end of the sidewall part 32c on the optical fiber housing part 12 side, and the dividing part 43b is continuously connected to the leading end of the sidewall part 32b on the optical fiber housing part 12 side. Accordingly, since the guide part 32 and the dividing parts 42c and 43b are configured to be integrated with each other, the optical fiber bundle Wb guided by the guide part 32 is easily divided by the first dividing body 41 in the optical fiber housing part 12.

The second dividing body 51 is apart for dividing the optical fiber bundle Wb housed in the optical fiber housing part 12, and provided to face and be separated from the first dividing body 41 in the direction X. The second dividing body 51 is provided by bending a member having a bar-like shape into substantially a U-shape, for example. The second dividing body 51 includes a base part 51a attached to the lateral plate 14, a dividing part 51b (one second dividing bar) that extends from the one end of the base part 51a in the direction Y toward the first dividing body 41, and a dividing part 51c (the other second dividing bar) that extends from the other end of the base part 51a in the direction Y toward the first dividing body 41. The base part 51a is fixed to the lateral plate 14 via a screw and the like, for example. A position to which the base part 51a is fixed is adjusted by the position of the corresponding first dividing body 41 in the direction Y.

The dividing parts 51b and 51c are bar-like parts provided being separated from each other in the direction Y. The dividing part 51b is positioned closer to the front part than the dividing part 51c in the direction Y. The dividing part 51b is provided to face and be separated from the dividing part 42c of the first bar-like member 42 in the direction X. The dividing part 51c is provided to face and be separated from the dividing part 43b of the second bar-like member 43 in the direction X. The dividing part 51b may be provided on an extended line of the dividing part 42c, and the dividing part 51c may be provided on an extended line of the dividing part 43b.

The second dividing member 19 is a member for dividing a part that extends to the outside from the optical fiber housing part 12 in each of the plurality of optical fiber bundles Wb. The second dividing member 19 is configured with a plurality of plate-like fragments arranged to be separated from each other along the direction Y. The second dividing member 19 is provided in the vicinity of the upper end of the lateral plate 14.

The effects obtained by the optical fiber rack 1 according to the present embodiment described above will be described. In the optical fiber rack 1, as illustrated in FIGS. 6 and 8, each of the termination units 2 includes the tray 22 slidable in the front-rear direction, and the plurality of adapters 23 provided side by side in a line on the tray 22. In addition, the plurality of optical fibers C3 that configure the optical fiber bundle Wb are connected to one end side of the plurality of adapters 23, and the plurality of coated optical fibers 8 with connector which are fusion-connected to the coated optical fiber C1 housed in the multicore cable 7c introduced from the outside are connected to the other end side. According to such a configuration, when inserting or removing the optical fiber C3 in the adapter 23, it becomes easy to pinch the upper and lower surfaces of the optical connector of the optical fiber C3 with fingers, and the insertion and removal of the optical connector can be easily performed. Therefore, the adapters 23 can be arranged at high density.

Figure 15:
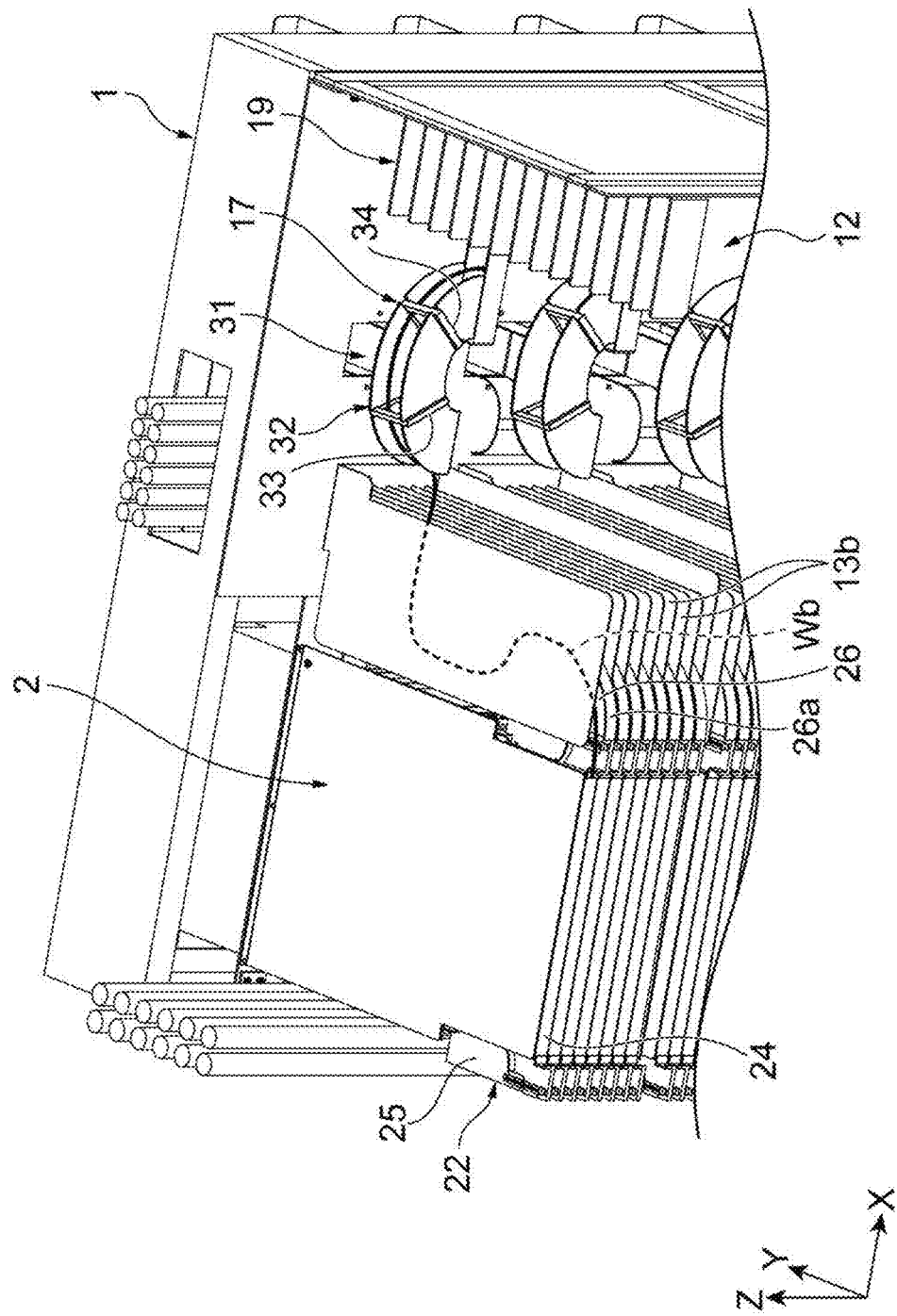
FIG. 15 is a perspective view illustrating a motion of the optical fiber bundle by a sliding operation of the tray.
Figure 16:
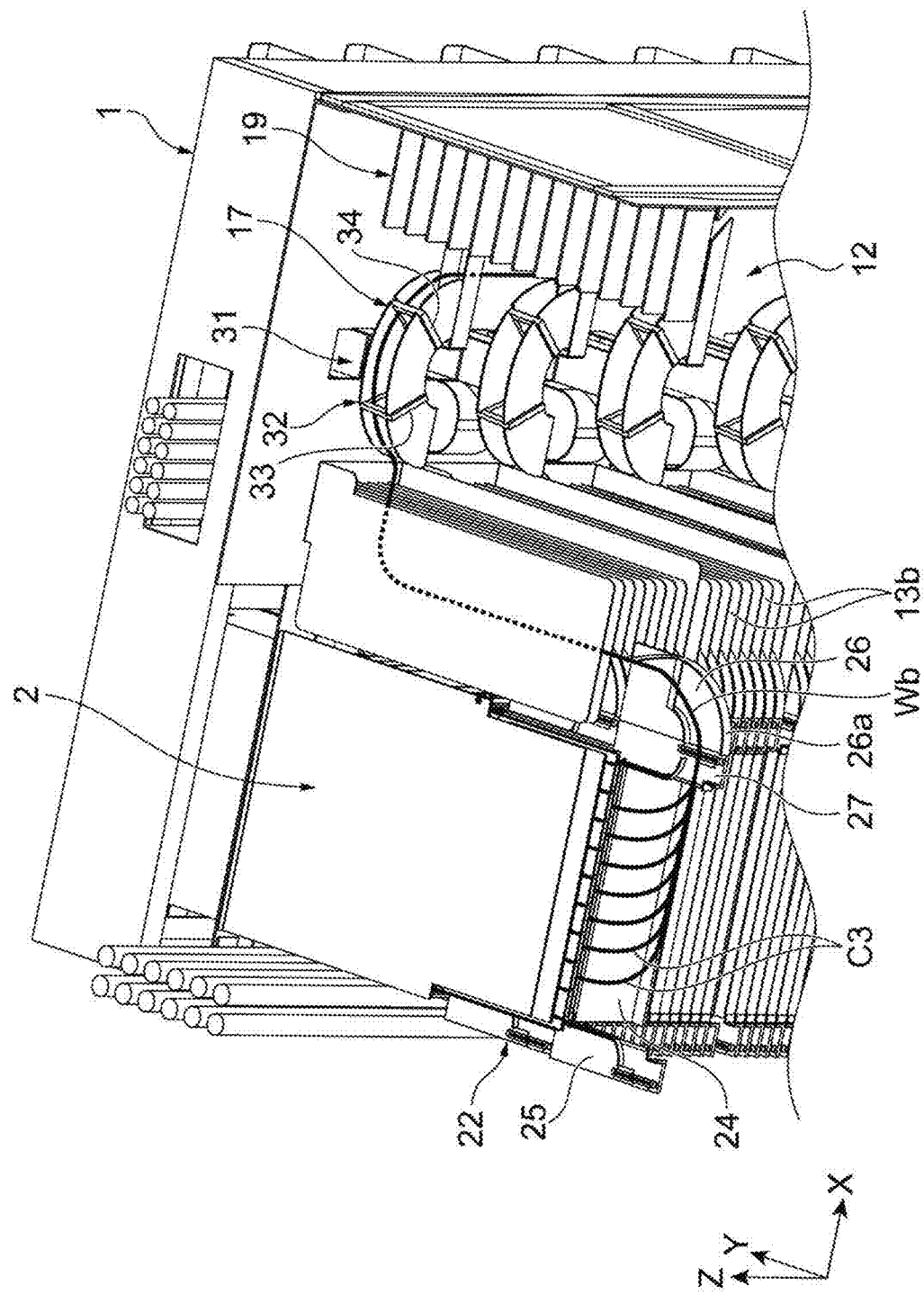
FIG. 16 is a perspective view illustrating a motion of the optical fiber bundle by the sliding operation of the tray.

FIGS. 15 and 16 are perspective views illustrating a motion of the cover part 24 by the sliding operation of the tray 22. FIG. 15 illustrates a state where the tray 22 is not pulled out (sliding rearward), and FIG. 16 illustrates a state where the tray 22 is pulled out (sliding forward). As illustrated in the drawings, the cover part 24 that protects one end side of the plurality of adapters 23 is rotatable with a shaft that extends along the direction X as a supporting shaft. In addition, when the tray 22 slides forward, the cover part 24 rotates downward (FIG. 16). Accordingly, it becomes easy for the finger to contact the lower surface of the optical connector of the optical fiber C3, and the optical connector can be more easily inserted and removed.

As described in the present embodiment, the tray 22 may further include the support parts 25 and 27 for locking and supporting the cover part 24, the support parts 25 and 27 being arranged with the cover part 24 in the direction X. Accordingly, the operator can perform the rotation operation of the cover part 24 at any timing, and the workability can be improved.

The optical fiber rack according to the present invention is not limited to the above-described embodiment, and other various modifications may be adopted. For example, in the above-described embodiment, the termination unit 2 positioned on the lowermost side in the rack part 11 is optically linked to the coated optical fiber C2 housed in the local fusion cable 13c, but the present invention is not limited thereto. As a specific example, a termination unit other than the termination unit positioned on the lowermost side may be optically linked to the coated optical fiber C2 housed in the local fusion cable 13c, or the all of the termination units 2 may be optically linked to the coated optical fiber C1 housed in the corresponding multicore cable 7c.

In the above embodiment, the optical fiber guide 17 is provided with the curved plate 31e, but the present invention is not limited thereto. For example, the curved plate 3e may be attached to the surface of the partition plate 13. The curved plate 31e is not necessarily provided. For example, a part of the optical fiber guides 17 may not have the curved plate 31e.

In the above embodiment, the number of optical fiber guides 17 and the number of first dividing members 18 may be the same or different from each other. For example, the number of optical fiber guides 17 may the same as the number of termination units 2, and the number of first dividing members 18 may be less than the number of termination units 2.

In the above embodiment, the restriction parts 33 and 34 are provided, but the present invention is not limited thereto. For example, any one of the restriction parts 33 and 34 may be provided. Alternatively, the optical fiber guide may be provided with other restriction part than the restriction parts 33 and 34. The shapes of the restriction parts 33 and 34 are not specifically limited. For example, the restriction part may be a part of the sidewall parts 32b and 32c of the guide part 32.

REFERENCE SIGNS LIST

1 . . . optical fiber rack, 1a . . . bottom frame part, 1d . . . top frame part, 1e . . . opening, 2 . . . termination unit, 4 . . . first external connection part, 4a . . . fusion tray, 6 . . . second external connection part, 7 . . . cable housing part, 7c . . . multicore cable, 8 . . . coated optical fiber with connector, 11 . . . rack part, 12 . . . optical fiber housing part, 13 . . . partition plate, 13a . . . opening, 13b . . . (second) support part, 13c . . . local fusion cable, 13x . . . cable housing part, 14 . . . lateral plate, 15 . . . rail, 15a . . . main part, 15b . . . branch part, 15c . . . disconnect part, 17 . . . optical fiber guide, 18 . . . first dividing member, 19 . . . second dividing member, 21 . . . adapter group, 22 . . . tray, 23 . . . adapter, 26 . . . (first) support part, 31 . . . guide part, 31a . . . bottom part, 31b, 31c . . . sidewall part, 31d . . . slope part, 31e . . . curved plate, 32 . . . guide part, 32b, 32c . . . sidewall part (wall part), 33 . . . restriction part, 41 . . . first dividing body, 42 . . . first bar-like member, 42c . . . dividing part, 43 . . . second bar-like member, 43b . . . dividing part, 51 . . . second dividing body, C1, C2 . . . coated optical fiber, C3 . . . optical fiber, C11 to C13 . . . cross-connect optical fiber, S . . . housing part, Wb . . . optical fiber bundle.

The invention claimed is:

1. A termination unit located in a rack part of an optical fiber rack, comprising:
a plurality of first optical fibers fusion-connected to a multicore cable introduced from an outside of the optical fiber rack;
a tray slidable in a first direction, the tray being provided on one end side of the termination unit in the first direction; and
a plurality of adapters which are arranged in a line on the tray, to which a plurality of second optical fibers are connected from each of one end sides of the plurality of adapters, and to which the plurality of first optical fibers are connected from each of the other end sides of the plurality of adapters,
wherein the tray includes a cover part configured to protect the one end side of the plurality of adapters, and the tray includes a support part configured to lock and support the cover part, the support part being provided side by side with the cover part in a second direction intersecting the first direction, and
wherein the cover part is rotatable with a shaft that extends along the second direction as a supporting shaft, and the cover part is configured to rotate downward when the tray has slid in a direction toward the one end side from the other end side.

2. The termination unit according to claim 1, wherein the support part has a fan shape in a plan view.

3. The termination unit according to claim 1, wherein the support part includes a guide configured to guide the plurality of second optical fibers toward the first direction, and
wherein the guide is located along an outer edge of the support part.

4. The termination unit according to claim 3, wherein the guide includes a part extending in a direction of approaching the tray.

5. The termination unit according to claim 4, wherein an inclined angle from the first direction of the part is 5° to 30°.

6. The termination unit according to claim 1, wherein the one end side of the termination unit corresponds to a front end side of the termination unit.

7. A termination unit located in a rack part of an optical fiber rack, comprising:
a first optical fiber fusion-connected to a multicore cable extending toward an outside of the optical fiber rack;
a tray slidable in a first direction, the tray being provided on a front end side of the termination unit; and
an adapter on the tray and in the termination unit, the adapter including a first end and a second end opposed to each other in the first direction,
wherein the first end is connected to a second optical fiber and the second end is connected to the first optical fiber,
wherein the tray includes a cover configured to protect the first end of the adapter,
wherein the cover part is rotatable with a shaft that extends along a second direction intersecting the first direction as a supporting shaft, and the cover part is configured to rotate downward when the tray has slid toward the front end side in the first direction, and wherein the tray includes a supporter configured to lock and support the cover, the supporter being provided side by side with the cover in the second direction.

8. The termination unit according to claim 7, wherein the supporter has a fan shape in a plan view.

9. The termination unit according to claim 7, wherein the supporter includes a guide configured to guide the second optical fiber toward the first direction, and wherein the guide is located along an outer edge of the supporter.

10. The termination unit according to claim 9, wherein the guide includes a part extending in a direction of approaching the tray.

11. The termination unit according to claim 10, wherein an inclined angle from the first direction of the part is 5° to 30°.

* * * * *